United States Patent
Amano et al.

(10) Patent No.: US 9,268,513 B2
(45) Date of Patent: Feb. 23, 2016

(54) FUNCTION PROVIDING SYSTEM THAT PROCESSES A USE REQUEST TO USE THE FUNCTION PROVIDING SYSTEM

(71) Applicant: FUJI XEROX CO., LTD., Tokyo (JP)

(72) Inventors: Yasushi Amano, Kanagawa (JP); Yosuke Kinoshita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/610,511

(22) Filed: Jan. 30, 2015

(65) Prior Publication Data

US 2016/0004491 A1  Jan. 7, 2016

(30) Foreign Application Priority Data

Jul. 3, 2014 (JP) .................................. 2014-138010

(51) Int. Cl.
  *G06F 3/12* (2006.01)
(52) U.S. Cl.
  CPC ............ *G06F 3/1238* (2013.01); *G06F 3/1285* (2013.01)
(58) Field of Classification Search
  None
  See application file for complete search history.

(56) References Cited

U.S. PATENT DOCUMENTS

| | | | |
|---|---|---|---|
| 7,528,988 B2* | 5/2009 | Agehama | G06K 15/026 345/600 |
| 8,613,082 B2 | 12/2013 | Aono et al. | |
| 2003/0233437 A1* | 12/2003 | Kitada et al. | 709/223 |
| 2005/0108557 A1* | 5/2005 | Kayo et al. | 713/189 |
| 2007/0006288 A1* | 1/2007 | Mayfield et al. | 726/5 |
| 2007/0192868 A1* | 8/2007 | Fujino | 726/26 |
| 2007/0282995 A1* | 12/2007 | Mizuno et al. | 709/223 |
| 2009/0077645 A1* | 3/2009 | Kottahachchi | 726/9 |
| 2010/0182640 A1* | 7/2010 | Daigo | 358/1.15 |
| 2010/0188682 A1* | 7/2010 | Shirai | 358/1.13 |
| 2013/0215446 A1* | 8/2013 | Imai | 358/1.13 |

FOREIGN PATENT DOCUMENTS

| | | | |
|---|---|---|---|
| JP | 2007-156786 A | 6/2007 | |
| JP | 2011-059805 A | 3/2011 | |

* cited by examiner

*Primary Examiner* — Ming Hon
(74) *Attorney, Agent, or Firm* — Oliff PLC

(57) ABSTRACT

A function providing apparatus includes a receiving unit that receives a use request to use the function providing apparatus, the use request including identification information identifying an operation unit to be operated to use the function providing apparatus, and a user using the function providing apparatus, a denial unit that, if the use request is intended to use the function providing apparatus in an unauthorized mode, denies use of the function providing apparatus in the unauthorized mode, and a providing unit that, if the use request is intended to use the function providing apparatus in the unauthorized mode, provides information that limits use of another function providing apparatus responsive to the use request including the identification information.

16 Claims, 21 Drawing Sheets

FIG. 5

| TERMINAL ID | USER ID | SERVICE | USE PERMISSION |
|---|---|---|---|
| tablet1 | | COPY/SCAN | GRANTED |
| | usr12345 | COPY/SCAN | GRANTED |

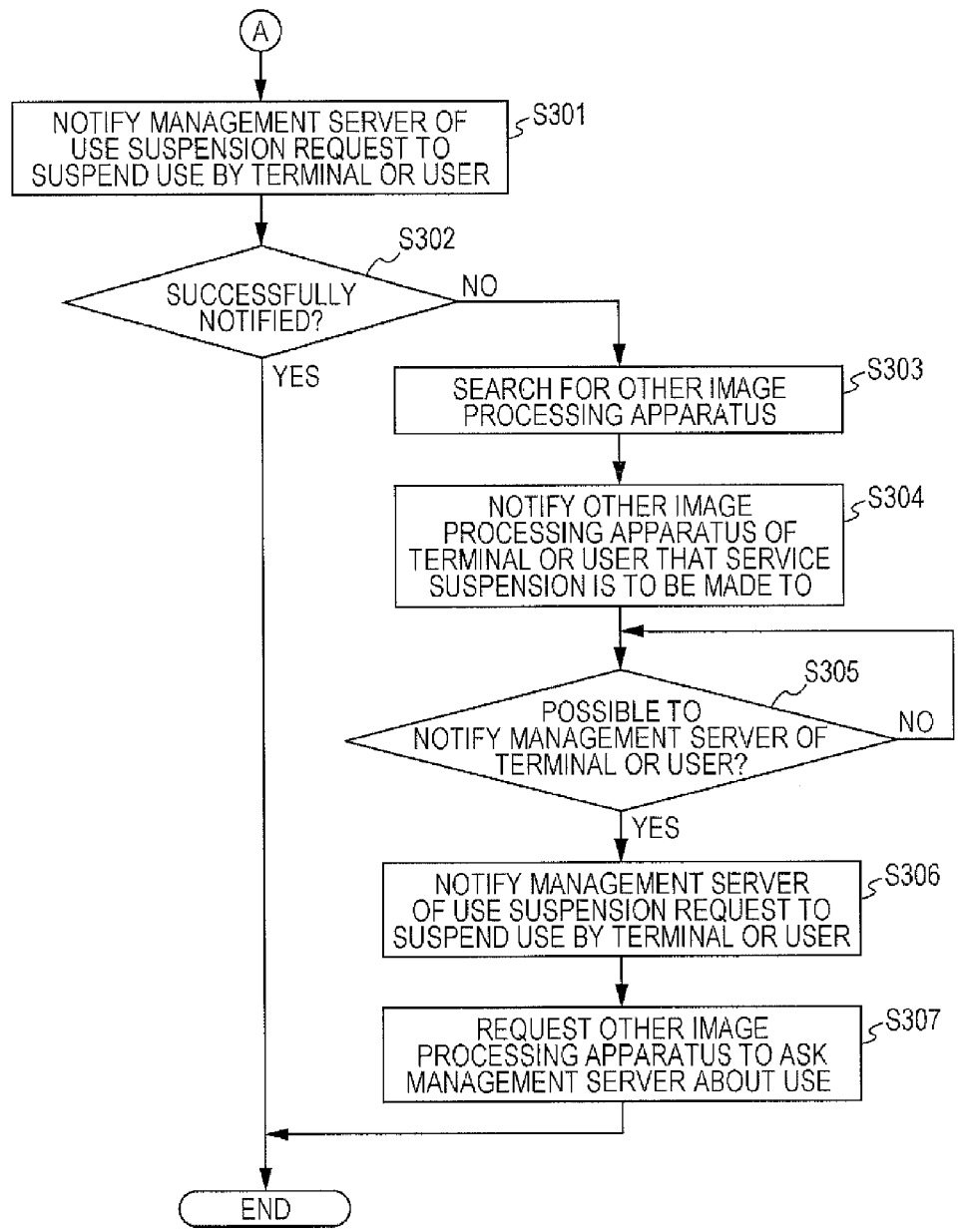

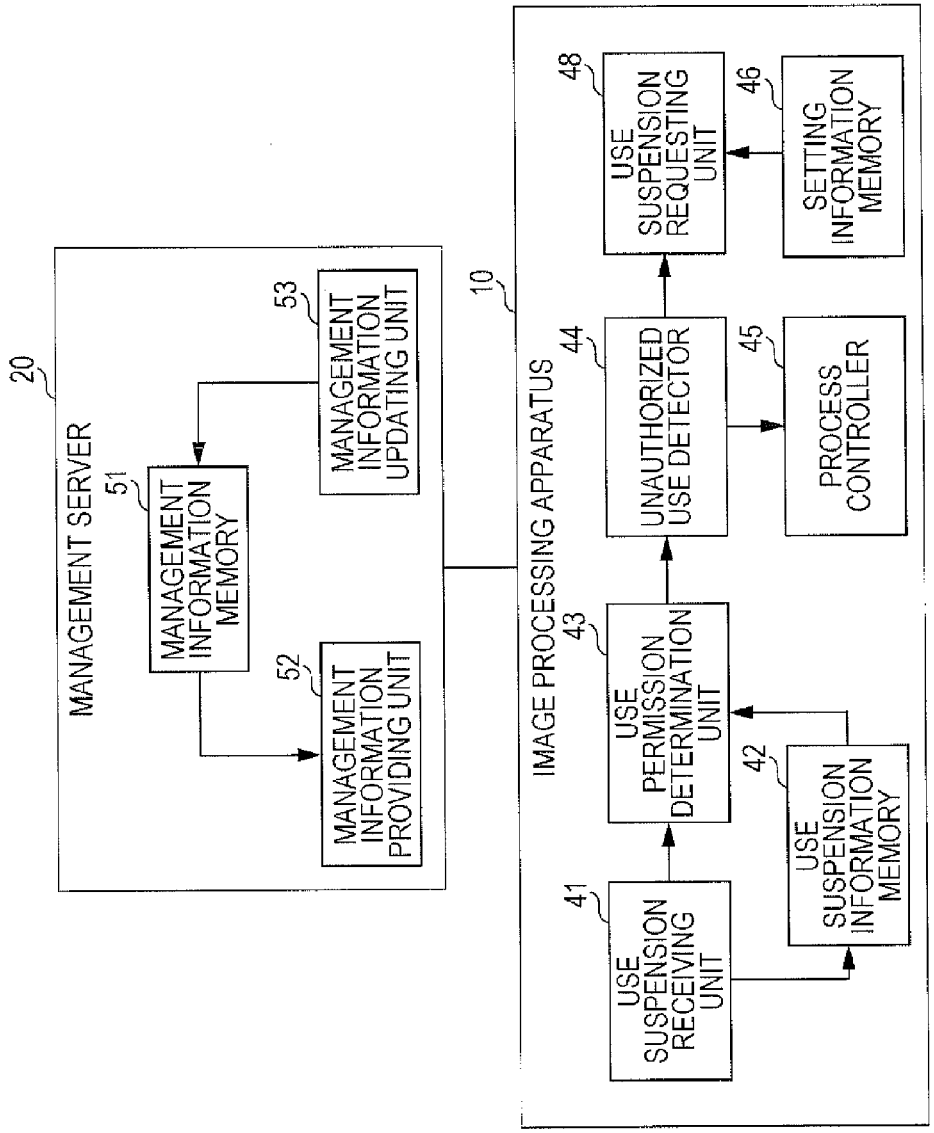

FIG. 9

| ITEMS OF UNAUTHORIZED USE | USE SUSPENSION SERVICE |
|---|---|
| TRANSFER OF IN-HOUSE DOCUMENT TO EXTERNAL SERVER | ·TRANSFER SERVICE TO EXTERNAL SERVER<br>·MAIL TRANSMISSION TO EXTERNAL ADDRESS |
| PRINT REQUEST OF CONFIDENTIAL DOCUMENT | ·PRINTING DOCUMENT OF DOCUMENT MANAGEMENT SERVER |
| COPYING OF BILL | ·USE NOT GRANTED |

FIG. 10

| TERMINAL ID | USER ID | SERVICE | USE PERMISSION |
|---|---|---|---|
| tablet1 | | TRANSFER SERVICE TO EXTERNAL SERVER<br>MAIL TRANSMISSION TO EXTERNAL ADDRESS<br>PRINTING OF DOCUMENT OF DOCUMENT MANAGEMENT SERVER | GRANTED |

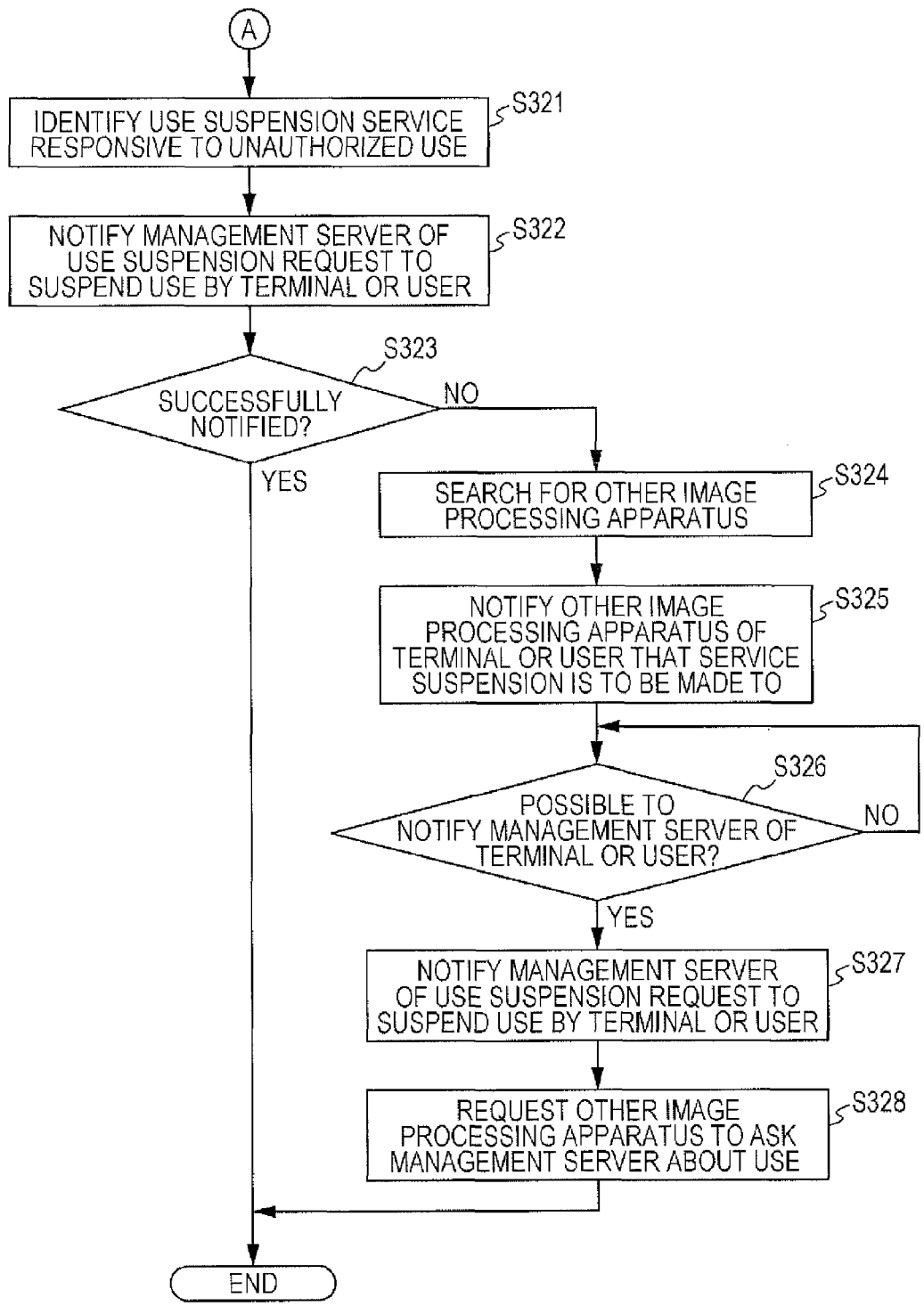

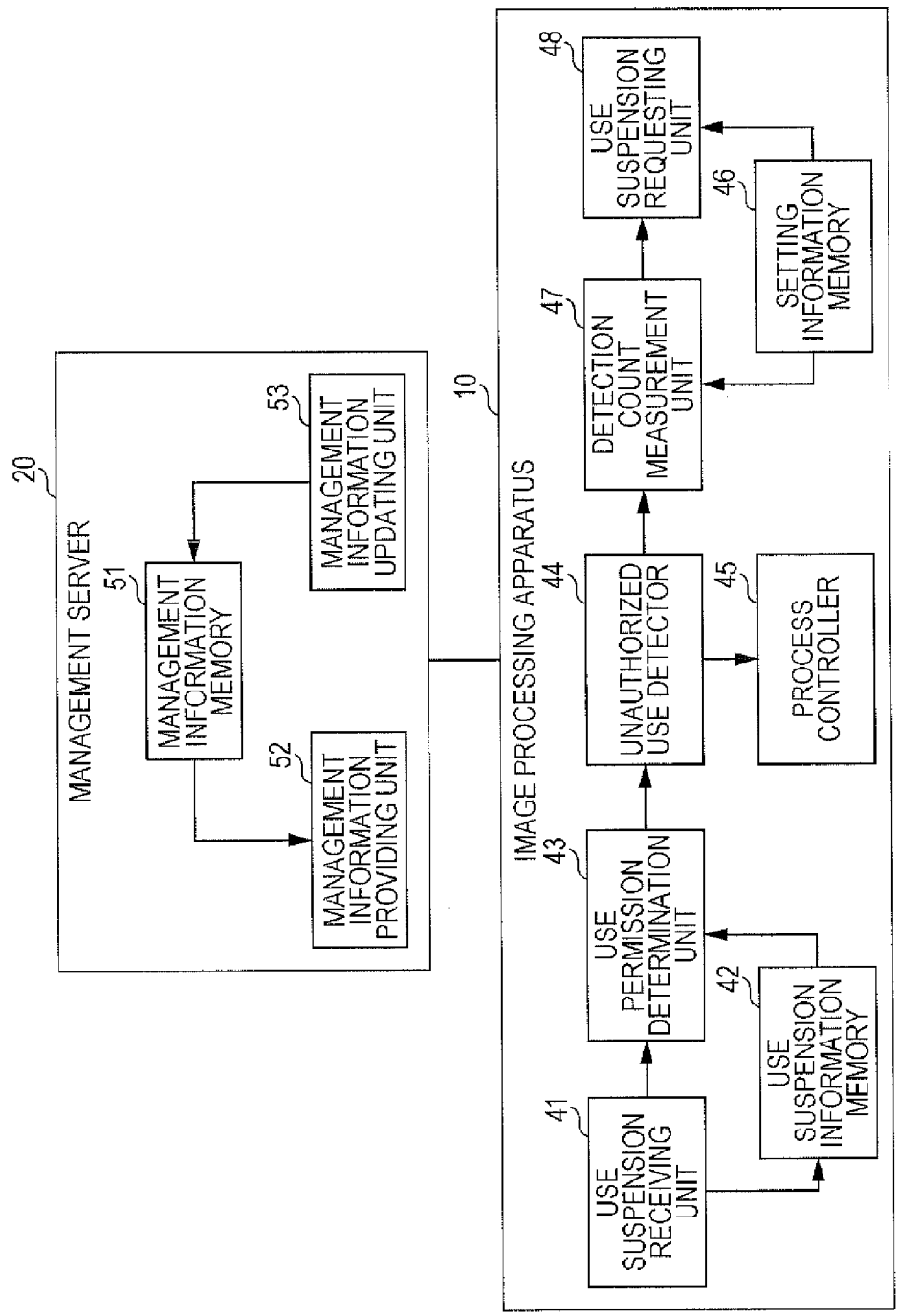

FIG. 13

| ITEMS OF UNAUTHORIZED USE | USE SUSPENSION SERVICE | MAXIMUM NUMBER OF WARNINGS |
|---|---|---|
| TRANSFER OF IN-HOUSE DOCUMENT TO EXTERNAL SERVER | ·TRANSFER SERVICE TO EXTERNAL SERVER<br>·MAIL TRANSMISSION TO EXTERNAL ADDRESS | 2 |
| PRINT REQUEST OF CONFIDENTIAL DOCUMENT | ·PRINTING DOCUMENT OF DOCUMENT MANAGEMENT SERVER | 2 |
| COPYING OF BILL | ·USE NOT GRANTED | 0 |

FIG. 14

| TERMINAL ID | USER ID | SERVICE | USE PERMISSION | DETECTION COUNT |
|---|---|---|---|---|
| tablet1 | | TRANSFER SERVICE TO EXTERNAL SERVER<br>MAIL TRANSMISSION TO EXTERNAL ADDRESS<br>PRINTING OF DOCUMENT OF DOCUMENT MANAGEMENT SERVER | GRANTED | TRANSFERS OF IN-HOUSE DOCUMENT TO EXTERNAL SERVER: 0<br>PRINT REQUESTS OF CONFIDENTIAL DOCUMENT: 2<br>COPYING OF BILL: 0 |

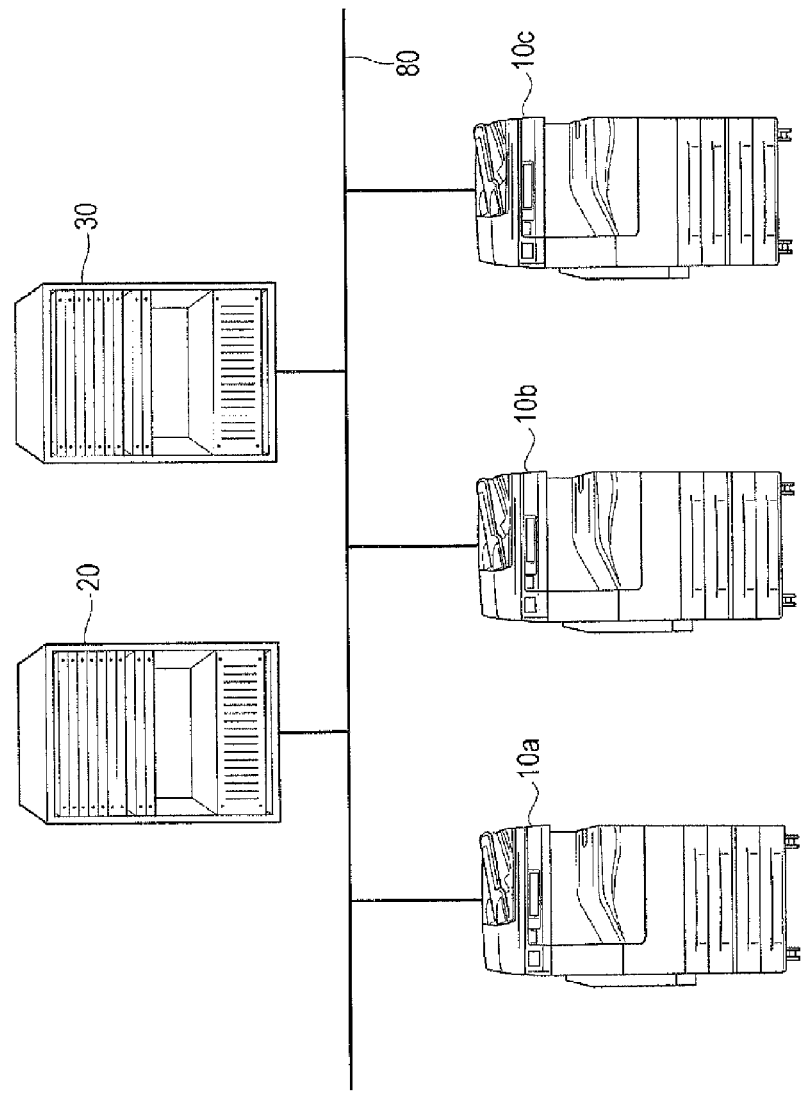

FIG. 18

| TERMINAL ID | USER ID | CLOUD SERVICE URL | CLOUD USER ID | OPERATION MODE |
|---|---|---|---|---|
| tablet1 | usr12345 | https://www.translation.com/ | honyaku_fx | JOB |

FIG. 21

| TERMINAL ID | USER ID | CLOUD SERVICE URL | CLOUD USER ID | VIEW PATH | OPERATION MODE |
|---|---|---|---|---|---|
| tablet1 | usr12345 | https://www.storage.com/ | hokan_fx | official | JOB |
| tablet1 | usr12345 | https://www.storage.com/ | hokan_fx | private | PRIVATE |

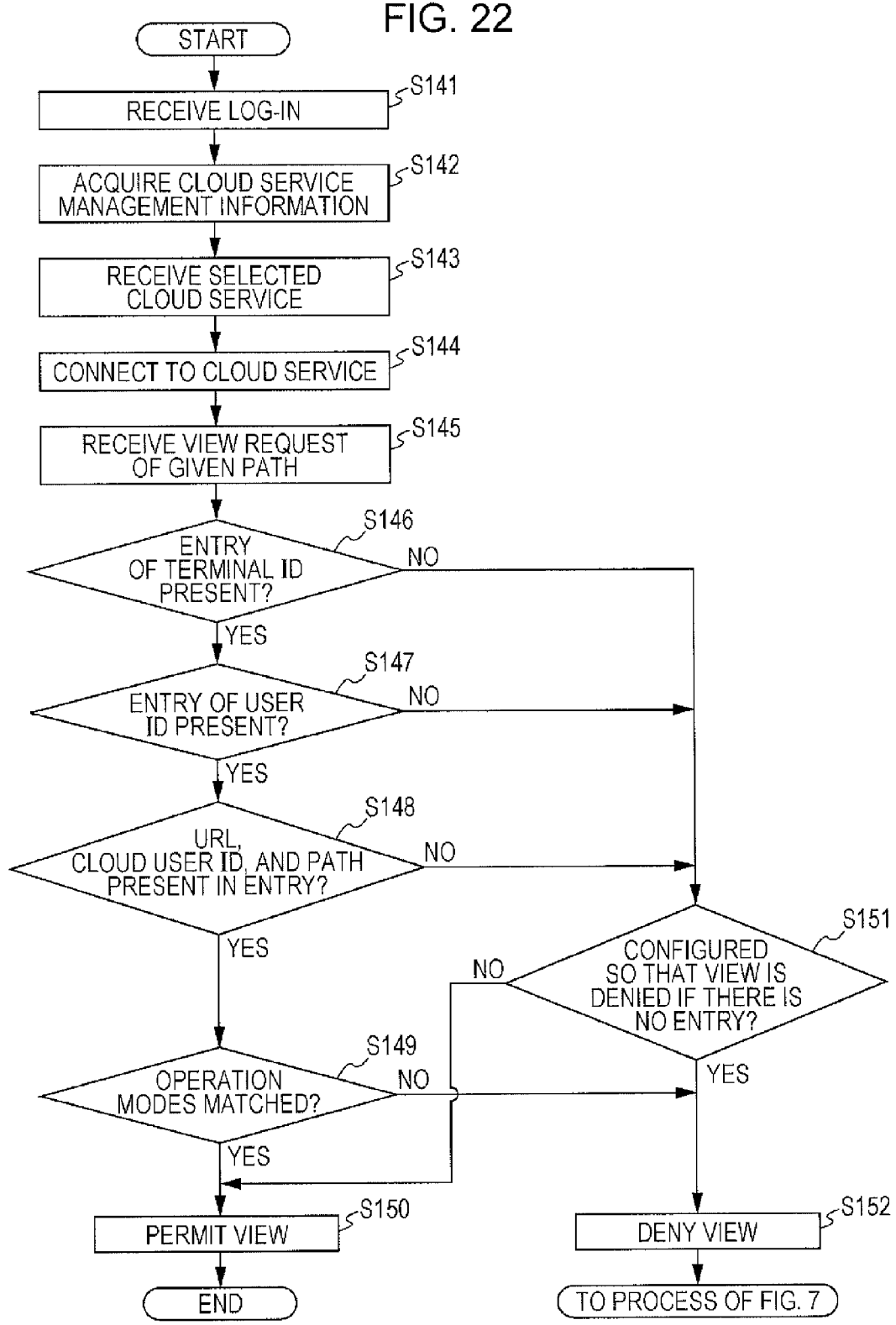

FUNCTION PROVIDING SYSTEM THAT PROCESSES A USE REQUEST TO USE THE FUNCTION PROVIDING SYSTEM

CROSS-REFERENCE TO RELATED APPLICATIONS

This application is based on and claims priority under 35 USC 119 from Japanese Patent Application No. 2014-138010 filed Jul. 3, 2014.

BACKGROUND

Technical Field

The present invention relates to a function providing apparatus, a function providing system, and a non-transitory computer readable medium.

SUMMARY

According to an aspect of the invention, there is provided a function providing apparatus. The function providing apparatus includes a receiving unit that receives a use request to use the function providing apparatus, the use request including identification information identifying an operation unit to be operated to use the function providing apparatus, and a user using the function providing apparatus, a denial unit that, if the use request is intended to use the function providing apparatus in an unauthorized mode, denies use of the function providing apparatus in the unauthorized mode, and a providing unit that, if the use request is intended to use the function providing apparatus in the unauthorized mode, provides information that limits use of a different function providing apparatus responsive to the use request including the identification information.

BRIEF DESCRIPTION OF THE DRAWINGS

Exemplary embodiments of the present invention will be described in detail based on the following figures, wherein:

FIG. 5 illustrates an example of management information stored on a management information memory in the management server of the first exemplary embodiment of the present invention;

FIG. 7 is a flowchart illustrating an operation example of the image processing apparatus of the first, fourth, and fifth exemplary embodiments of the present invention;

FIG. 8 is a functional block diagram illustrating the image processing system of the second exemplary embodiment of the present invention;

FIG. 9 illustrates an example of setting information stored on a setting information memory in the image processing apparatus of the second exemplary embodiment of the present invention;

FIG. 10 illustrates an example of management information stored on a management information memory in the management server of the second exemplary embodiment of the present invention;

FIG. 11 is a flowchart illustrating an operation example of the image processing apparatus of the second exemplary embodiment of the present invention;

FIG. 12 is a functional block diagram of the image processing system of the third exemplary embodiment of the present invention;

FIG. 13 illustrates an example of setting information stored on a setting information memory in the image processing apparatus of the third exemplary embodiment of the present invention;

FIG. 14 illustrates an example of management information stored on a management information memory in the management server of the third exemplary embodiment of the present invention;

FIG. 16 generally illustrates the image processing system of the fourth and fifth exemplary embodiments of the present invention;

FIG. 18 illustrates an example of cloud service management information stored on a cloud service management information memory in the management server of the fourth exemplary embodiment of the present invention;

FIG. 21 illustrates an example of cloud service management information stored on a cloud service management information memory in the management server of the fifth exemplary embodiment of the present invention; and FIG. 22 is a flowchart illustrating an operation example of the image processing apparatus of the fifth exemplary embodiment of the present invention.

DETAILED DESCRIPTION

Exemplary embodiments of the present invention are described in detail with reference to the drawings.

First Exemplary Embodiment

Figure 1:
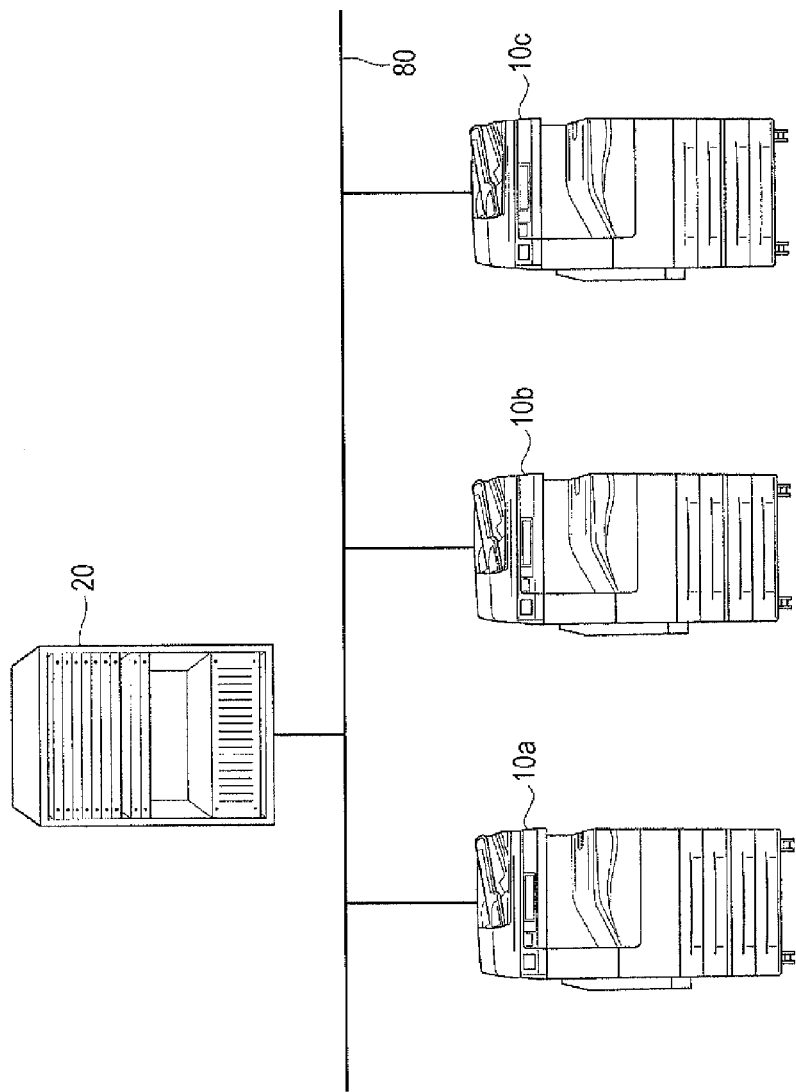
FIG. 1 illustrates the general configuration of an image processing system of first through third exemplary embodiments of the present invention.

FIG. 1 generally illustrates the configuration of an image processing system of a first exemplary embodiment of the present invention. As illustrated in FIG. 1, the image processing system includes image processing apparatuses 10a through 10c, and a management server 20 connected to the image processing apparatuses 10a through 10c via a communication network 80. Although the image processing apparatuses 10a through 10c are illustrated in FIG. 1, they may be collectively referred to as an image processing apparatus 10.

Referring to FIG. 1, the number of image processing apparatuses 10 is three, but four or more image processing apparatuses 10 may be included.

The image processing apparatus 10 performs at least one of the following operations including forming an image on a recording medium, such as a paper sheet, reading an image from the recording medium, receiving an image from a public network, and transmitting an image to the public network. From the viewpoint of image forming, the image processing apparatus 10 is a printer. From the viewpoint of image reading, the image processing apparatus 10 is a scanner. From the viewpoint of image reading and image forming, the image processing apparatus 10 is a copying machine. From the viewpoint of image reading and image transmission, the image processing apparatus 10 is a facsimile transmitter. From the viewpoint of image reception and image forming, the image processing apparatus 10 is a facsimile receiver. In the first exemplary embodiment, the image processing apparatus 10 is an example of a function providing apparatus that provides a function.

The management server 20 is a server computer that manages the image processing apparatus 10. The management server 20 manages a terminal apparatus or a user permit to use the image processing apparatus 10, receives an inquiry from the image processing apparatus 10 specifying the terminal apparatus or the user, and then replies to the image processing apparatus 10 as to whether to permit the terminal apparatus or the user to use the image processing apparatus 10. In the first exemplary embodiment, the management server 20 is included as an example of a management apparatus that manages multiple function providing apparatuses.

The communication network 80 is used to perform information communications between the image processing apparatus 10 and the management server 20. The communication network 80 may be the Internet, for example.

Figure 2:
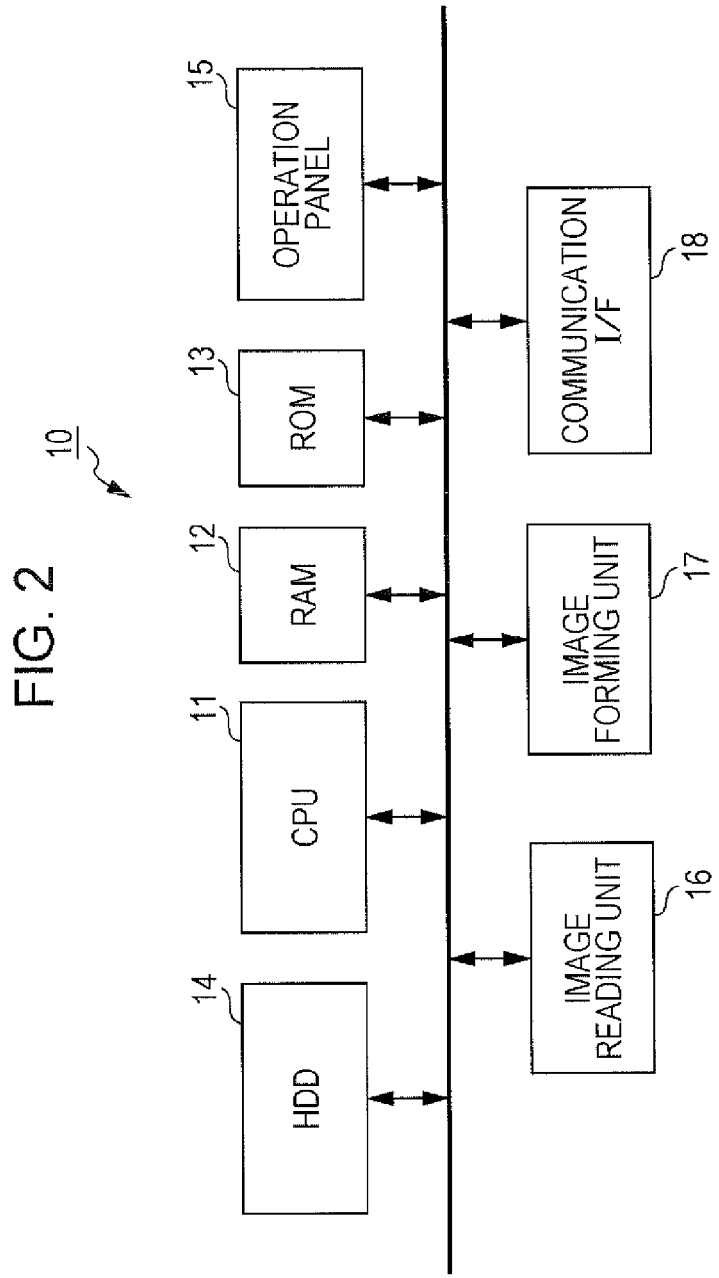
FIG. 2 illustrates the hardware configuration of a image processing apparatus of first through fifth exemplary embodiments of the present invention.

FIG. 2 illustrates the hardware configuration of the image processing apparatus 10 of the first exemplary embodiment. As illustrated in FIG. 2, the image processing apparatus 10 includes a central processing unit (CPU) 11, a random-access memory (RAM) 12, a read-only memory (ROM) 13, a hard disk drive (HDD) 14, an operation panel 15, an image reading unit 16, an image forming unit 17, and an communication interface (I/F) 18.

The CPU 11 implements each of the functions described below by loading a variety of programs stored on the ROM 13 or the like onto the RAM 12.

The RAM 12 serves as a working memory of the CPU 11.

The ROM 13 stores the variety of programs to be executed by the CPU 11.

The HDD 14 is a magnetic disk device, for example. The HDD 14 stores image data read by the image reading unit 16 and image data used by the image forming unit 17 in image forming.

The operation panel 15 is a touchpanel that displays a variety of information and receives an operation input entered by the user. The operation panel 15 includes a display that displays a variety of information, and a location detection sheet that detects a location pointed to by a finger of a user or a stylus pen. The operation panel 15 may be replaced with a display and a keyboard.

The image reading unit 16 reads an image recorded on a recording medium, such as a paper sheet. The image reading unit 16 is a scanner, for example, and is based on a charge-coupled device (CCD) system or a contact image sensor (CIS) system. In the CCD system, a document is irradiated with a light beam, and a light beam reflected from the document is then collected via a lens. In the CIS system, a document is irradiated with a light beam from a light emitting diode (LED), and a light beam reflected from the document is received by a CIS sensor.

The image forming unit 17 forms an image on a recording medium. The image forming unit 17 is a printer, for example, and may be an electrophotographic system that forms an image on a recording medium by transferring toner on a photoconductor drum to the recording medium, or an ink-jet system that forms an image on a recording medium by ejecting ink onto the recording medium.

The communication I/F 18 exchanges a variety of information with another image processing apparatus via the communication network 80.

Figure 3:
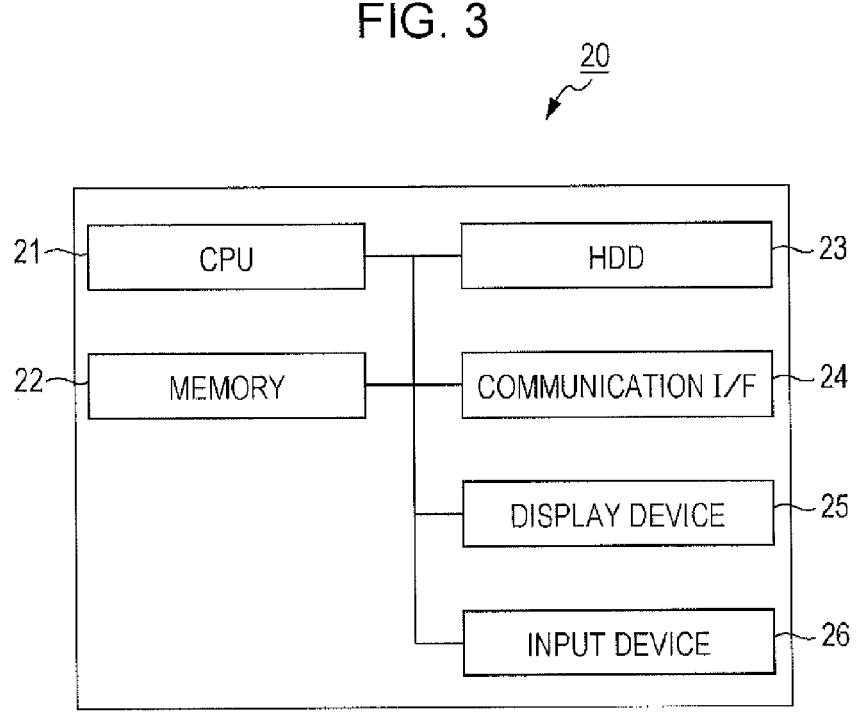
FIG. 3 illustrates the hardware configuration of a management server of the first through fifth exemplary embodiments of the present invention.

FIG. 3 illustrates the hardware configuration of the management server 20 of the first exemplary embodiment. As illustrated in FIG. 3, the management server 20 includes a CPU 21, a memory 22, an HDD 23, a communication interface 24, a display 25, and an input device 26.

The CPU 21 implements the functions of the management server 20 by loading a variety of programs stored on the HDD 23 onto the memory 22 and executing the programs.

The memory 22 serves a working memory of the CPU 21.

The HDD 23 stores the variety of programs that the CPU 21 executes, and data created by or acquired by the management server 20.

The communication I/F 24 exchanges a variety of information with another image forming apparatus via the communication network 80.

The display 25 displays a variety of information output from inside the management server 20. The display 25 may be a liquid-crystal display, for example.

The input device 26 receives information entered by the user, and inputs the information to the management server 20.

In the image processing system of the first exemplary embodiment thus constructed, the image processing apparatus 10 may detect unauthorized use of identification information of a terminal apparatus (hereinafter referred to as a "terminal ID") or identification information of a user (hereinafter referred to as a "user ID"). Upon detecting the unauthorized use, the image processing apparatus 10 suspends an operation for the unauthorized use and registers on the management server 20 a use suspension request of another image processing apparatus 10 using the terminal. ID or the user ID. If there is a difficulty in connecting to the management server 20, the image processing apparatus 10 issues to the other image processing apparatus 10 a use suspension request to suspend the use based on the terminal ID or the user ID. After the connection to the management server 20 is restored, the image processing apparatus 10 registers on the management server 20 the use suspension request to suspend the use of the other image processing apparatus 10 based on the terminal ID or the user ID, and requests the other image processing apparatus 10 to reference the management server 20.

Figure 4:
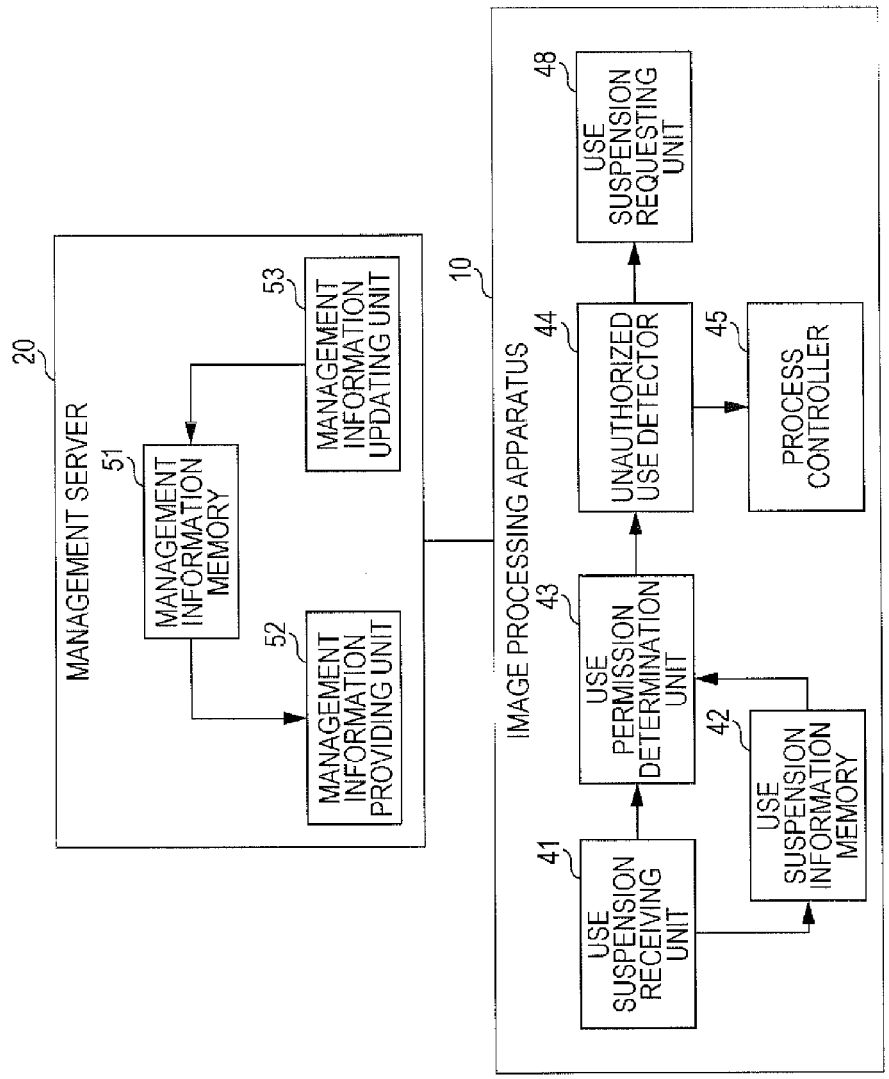
FIG. 4 is a functional block diagram of the image processing system of the first exemplary embodiment of the present invention.

FIG. 4 is a functional block diagram illustrating the image processing system of the first exemplary embodiment. As illustrated in FIG. 4, the image processing apparatus 10 includes a use suspension receiving unit 41, a use suspension information memory 42, a use permission determination unit 43, an unauthorized use detector 44, a process controller 45, and a use suspension requesting unit 48. The management server 20 includes a management information memory 51, a management information providing unit 52, and a management information updating unit 53.

The elements and memory forming the image processing apparatus 10 are described below.

The use suspension receiving unit 41 receives the terminal ID or the user ID notified by an image processing apparatus 10 that is used in an unauthorized fashion.

The use suspension information memory 42 stores the terminal ID or the user ID received by the use suspension receiving unit 41.

The use permission determination unit 43 determines whether there has been a use request to use the image processing apparatus 10 using the terminal ID or the user ID. If the use permission determination unit 43 determines that a use request to use the image processing apparatus 10 using the terminal ID or the user ID has been made, the use permission determination unit 43 recognizes the terminal ID or the user ID, and then determines whether the image processing apparatus 10 is usable in response to the use request. Upon determining that the image processing apparatus 10 is usable in response to the use request, the use permission determination unit 43 identifies a service corresponding to the recognized terminal ID or user ID, and then permits the service using the terminal ID or the user ID to be performed. In the first exemplary embodiment, the terminal apparatus is used as an example of an operation unit to use the image processing apparatus. The terminal ID is used as an example of identification information identifying the operation unit, and the user ID is used as an example of identification information identifying the user who uses the image processing apparatus. The use permission determination unit 43 is used as an example of a receiving unit that receives the use request including the identification information, and as an example of a controller that performs control to limit the use of the image processing apparatus in response to the use request including the identification information.

The unauthorized use detector 44 determines whether the use of the image processing apparatus 10 in accordance with the terminal ID or the user ID recognized by the use permission determination unit 43 is unauthorized use or not.

The process controller 45 controls the operation executed for the unauthorized use so that the operation is suspended. In the first exemplary embodiment, the process controller 45 serves as an example of a denial unit that denies the use of the function providing apparatus in an unauthorized fashion.

The use suspension requesting unit 48 notifies the management server 20 of a use suspension request of use of another image processing apparatus 10 in response to the use request using the terminal ID or the user ID recognized by the use permission determination unit 43. If the use suspension requesting unit 48 fails to notify the management server 20 of the use suspension request, the use suspension requesting unit 48 searches for another image processing apparatus 10 over a network, and notifies a found image processing apparatus 10 of the suspension request of the use responsive to the use request using the terminal ID or the user ID. If communication is established with the management server 20, the use suspension requesting unit 48 notifies the management server 20 of the suspension request of the use of the other image processing apparatus 10 responsive to the use request using the terminal ID or the user ID. The use suspension requesting unit 48 requests the other image processing apparatus 10 to place an inquiry to the management server 20. In the first exemplary embodiment, the use permission determination unit 43 notifies the management server 20 of a request not to authenticate the terminal ID or the user ID recognized by the use permission determination unit 43 as the use suspension request. In the first exemplary embodiment, the use suspension requesting unit 48 serves as an example of a providing unit that provides information that limits use of the other function providing apparatus responsive to the use request including the identification information, or as an example of a notifying unit that notifies the management apparatus of limitation information that limits use of multiple function providing apparatuses responsive to the use request including the identification information.

These elements and memories described above are implemented when software resources and hardware resources operate in cooperation. More specifically, the CPU 11 (see FIG. 2) reads from the ROM 13 (see FIG. 2) onto the RAM 12 (see FIG. 2) a program that implements the use suspension receiving unit 41, the use permission determination unit 43, the unauthorized use detector 44, the process controller 45, and the use suspension requesting unit 48. The CPU 11 then executes the program, thereby implementing the elements. The use suspension information memory 42 is implemented by the HDD 14 (see FIG. 2), for example.

Elements and memory implementing the management server 20 are described below.

The management information memory 51 stores management information that associates the terminal ID, the user ID, and use permission. In the first exemplary embodiment, the management information memory 51 serves as an example of a storage unit that stores the limitation information.

The management information providing unit 52 provides the image processing apparatus 10 with the management information stored on the management information memory 51.

The management information updating unit 53 updates the management information stored on the management information memory 51 in response to an instruction from the image processing apparatus 10.

These elements and memories described above are implemented when software resources and hardware resources operate in cooperation. More specifically, the CPU 21 (see FIG. 3) reads from the HDD 23 (see FIG. 3) onto the memory 22 (see FIG. 3) a program that implements the management information providing unit 52 and the management information updating unit 53. The CPU 21 then executes the program, thereby implementing the elements. The management information memory 51 is implemented by the HDD 23 (see FIG. 3), for example.

FIG. 5 illustrates an example of the management information stored on the management information memory 51 of FIG. 4. As illustrated in FIG. 5, the management information associates the terminal ID, user ID, service, and use permission. The terminal ID is identification information of the terminal apparatus as described above. The user ID is identification information of the user as described above. The service is provided by the image processing apparatus 10. The use permission is information that indicates whether the use of the service using the corresponding terminal ID or user ID is permitted.

Figure 6:
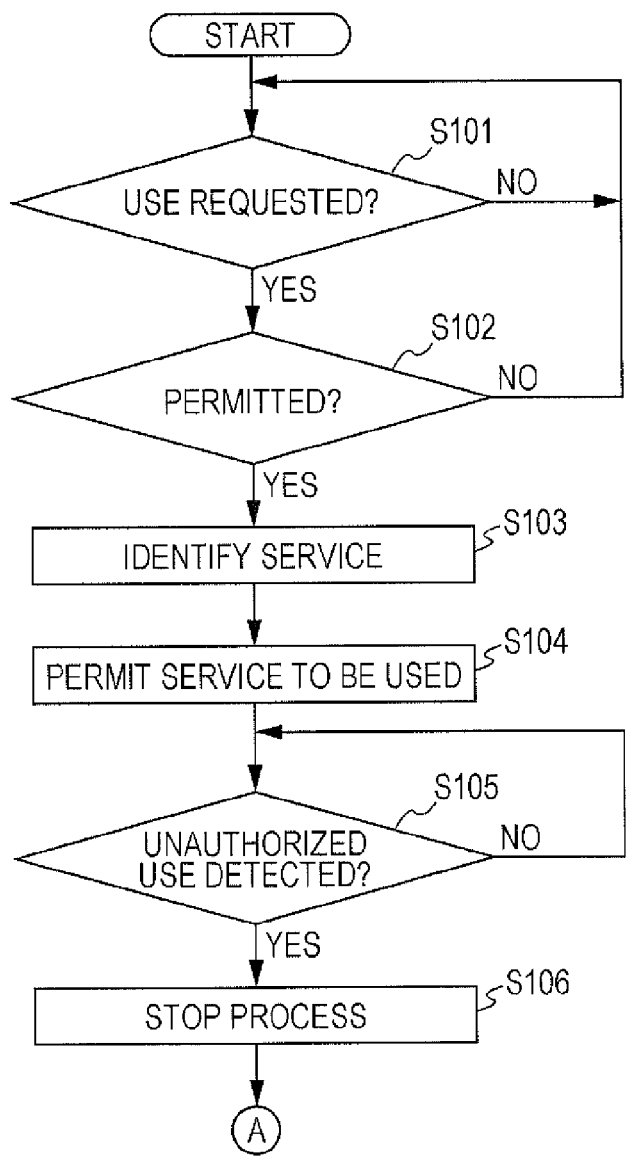
FIG. 6 is a flowchart illustrating an operation example of the image processing apparatus of the first through third exemplary embodiments of the present invention

The operation of the image processing apparatus 10 of the first exemplary embodiment is described below. FIG. 6 and FIG. 7 are flowcharts illustrating the operation of the image processing apparatus 10 of the first exemplary embodiment.

Referring to FIG. 6, the use permission determination unit 43 in the image processing apparatus 10 determines whether the use request to use the image processing apparatus 10 using the terminal ID or the user ID has been issued or not (step S101). If it is determined that the use request to use the image processing apparatus 10 using the terminal ID or the user ID has not been issued, the use permission determination unit 43 repeats step S101.

Upon determining that the use request to use the image processing apparatus 10 using the terminal ID or the user ID has been issued, the use permission determination unit 43 determines whether the use of the image processing apparatus 10 responsive to the use request is permitted (step S102). If it is determined that the use of the image processing apparatus 10 responsive to the use request is not permitted, the use permission determination unit 43 returns to step S101. If it is determined that the use of the image processing apparatus 10 responsive to the use request is permitted, the use permission determination unit 43 proceeds to step S103.

The determination operation in step S102 in the first exemplary embodiment may be performed as described below. First, the use permission determination unit 43 determines which of the management information stored on the management information memory 51 and use suspension information stored on the use suspension information memory 42 is to be referenced. The use permission determination unit 43 stores, as default information, information specifying that the management information is to be referenced. If the information specifying that the use suspension information is to be referenced is notified in step S304 of FIG. 7, or if the information specifying that the management information is to be referenced is notified in step S307 of FIG. 7, that notified information is stored instead of the default information. The determination of whether to reference the management information or the use suspension information may be performed based on the stored information. If it is determined that the management information is to be referenced, the use permission determination unit 43 determines whether the use of the image processing apparatus 10 is permitted, based on the management information stored on the management information memory 51. More specifically, the use permission determination unit 43 determines whether the image processing apparatus 10 is permitted, depending on whether the user permission "granted" is registered in the terminal ID or the user ID specified in step S101 in the management information that the management information providing unit 52 provides in response to the inquiry to the management server 20. In response to the determination that the use suspension information is to be referenced, the use permission determination unit 43 determines whether the use of the image processing apparatus 10 is permitted, based on the use suspension information stored on the use suspension information memory 42. More specifically, the use permission determination unit 43 determines whether the use of the image processing apparatus 10 is permitted, depending on whether the terminal ID or the user ID specified in step S101 is stored as the use suspension information.

The use permission determination unit 43 identifies the service associated with the terminal ID or the user ID specified in step S101 based on the management information provided by the management information providing unit 52 (step S103). The use permission determination unit 43 thus permits the use of the service using the terminal ID or the user ID (step S104). More specifically, a service may be requested in the image processing apparatus 10 using the terminal ID or the user ID. The use permission determination unit 43 permits the use of the service if the service is registered for the terminal ID or the user ID in the management information. If the service is not registered for the terminal ID or the user ID in the management information, the use permission determination unit 43 denies the use of the service.

The unauthorized use detector 44 determines whether the use of the image processing apparatus 10 in accordance with the terminal ID or the user ID specified in step S101 falls within a category of unauthorized use (step S105). The unauthorized use herein includes transfer of an in-house document to an external server, a print request of a confidential document, and copying of a bill. The image processing apparatus 10 may pre-store the categorization as to what kind of use of the image processing apparatus 10 is interpreted as the unauthorized use. If it is determined in step S105 that the use of the image processing apparatus 10 is not categorized as the unauthorized use, the unauthorized use detector 44 repeats the operation in step S105. If it is determined in step S105 that the use of the image processing apparatus 10 is categorized as the unauthorized use, the process controller 45 suspends the operation to be executed for the unauthorized use (step S106).

As illustrated in FIG. 7, the use suspension requesting unit 48 in the image processing apparatus 10 notifies the management server 20 a suspension request to suspend the use of the image processing apparatus 10 in accordance with the terminal ID or the user ID specified in step S101 (step S301). The use suspension requesting unit 48 then determines whether the management server 20 has been successfully notified (step S302). For example, if the communication network 80 malfunctions, the notification to the management server 20 may fail. If it is determined in step S302 that the management server 20 has been successfully notified, the use suspension requesting unit 48 ends the process. The management information updating unit 53 in the management server 20 updates the management information stored on the management information memory 51 in response to the suspension request notified by the image processing apparatus 10. More specifically, the use permission associated with the terminal ID or the user ID specified in step S101 in the management information is rewritten to "not granted". For example, the management information of FIG. 5 may now be stored on the management information memory 51, and unauthorized use may be performed using terminal ID "tablet1". In such a case, the use permission associated with the terminal ID "tablet1" in the management information of FIG. 5 is rewritten from "granted" to "not granted".

If the management server 20 has not been successfully notified, the use suspension requesting unit 48 searches for another image processing apparatus 10 whose use in accordance with the terminal ID or the user ID specified in step S101 is not desirable (step S303). The search method of the image processing apparatus 10 is described below. The use suspension requesting unit 48 notifies the image processing apparatus 10 found in step S303 of the terminal ID or the user ID specified in step S101 (step S304). The use suspension receiving unit 41 in the other image processing apparatus 10 receives the terminal ID or the user ID from the image processing apparatus 10 used in an unauthorized fashion and the use suspension information memory 42 stores the terminal ID or the user ID. The use suspension receiving unit 41 requests the use permission determination unit 43 to reference the use suspension information memory 42 when the use permission determination unit 43 determines in step S102 whether the use of the image processing apparatus 10 responsive to the use request is permitted.

The use suspension requesting unit 48 determines whether the notification to the management server 20 becomes possible (step S305). For example, if the malfunction of the communication network 80 is corrected, the notification to the management server 20 becomes possible. If it is determined in step S305 that the notification to the management server 20 is still not possible, the use suspension requesting unit 48 repeats the operation in step S305. If it is determined in step S305 that the notification to the management server 20 is possible, the use suspension requesting unit 48 notifies the management server 20 of the suspension request to suspend the use of the image processing apparatus 10 in accordance with the terminal ID or the user ID specified in step S101 (step S306). The use suspension requesting unit 48 requests the use permission determination unit 43 to place an inquiry to the management server 20 when the use permission determination unit 43 determines in step S102 whether the use of the image processing apparatus 10 is permitted (step S307).

The search method of the other image processing apparatus 10 in step S303 is described below.

A first search method applied with multiple image processing apparatuses 10 present in the same network is described. In the first search method, the image processing apparatus 10 performs broadcasting for search, and another image processing apparatus 10 on the same network replies to the broadcasting. The other image processing apparatus 10 is thus searched for. In this case, the image processing apparatus 10 transmits to the other image processing apparatus 10 the use suspension request of the terminal ID or the user ID used in the unauthorized use. Each of the other image processing apparatuses 10 checks communications with the management server 20. After the connection with the management server 20 is restored, the image processing apparatus 10 transmits the use suspension request to the management server 20. In another method, the image processing apparatus 10 may create an unauthorized use list listing the terminal IDs or the user IDs used in an unauthorized fashion, and notifies the other image processing apparatuses 10 of a destination to which the unauthorized use list is disclosed. After the connection with the management server 20 is restored, the image processing apparatus 10 updates the unauthorized use list on the management server 20.

A second search method applied with multiple image processing apparatuses 10 present in a different network is described. In the second search method, an apparatus management server (different from the management server 20) managing the multiple image processing apparatuses 10 identifies another image processing apparatus 10. The image processing apparatus 10 transmits to the apparatus management server the use suspension request of the terminal ID or the user ID used in an unauthorized fashion, and the apparatus management server transmits the use suspension request to the other image processing apparatus 10. Each of the other image processing apparatuses 10 checks the connection to the management server 20. After the connection with the management server 20 is restored, each of the other image processing apparatuses 10 transmits the use suspension request to the management server 20.

In a modification of the first exemplary embodiment, an application program installed on the image processing apparatus 10 detects unauthorized use that is defined on the application program. For example, a request application is described herein as the application program. The request application determines whether digital watermark information in a target document is authorized information. If the digital watermark information is authorized information, information of formatted text is extracted from the target document. If the digital watermark information is not authorized information, the request application notifies the image processing apparatus 10 that the unauthorized use has been performed. In yet another modification of the first exemplary embodiment, "copying" and "request application" are registered as services available to a given user in the management information of the management server 20. In such a modification, the image processing apparatus 10 may now be notified of the detection of unauthorized use while the user is using the request application. The image processing apparatus 10 transmits the use suspension request against the use by that user to the management server 20, and the management server 20 modifies the services available to the user in the management information. More specifically, the management server 20 deletes the "request application" from the services, and the service available to the user is "copying".

These modifications may be implemented by introducing a step for "the use of the request application" between step S104 and step S105 in FIG. 6, and by modifying the operation in step S105 of FIG. 6 to "Unauthorized use detected in the request application?".

In the first exemplary embodiment, the process controller 45 suspends the operation intended to perform the unauthorized use when the unauthorized use detector 44 detects the unauthorized use. The first exemplary embodiment may be modified. For example, a force log-out unit may be incorporated. When the unauthorized use detector 44 detects the unauthorized use, the force log-out unit forces the terminal ID or the user ID in a log-in state to log out.

Second Exemplary Embodiment

The general configuration of the image processing system of a second exemplary embodiment is identical to that of the first exemplary embodiment illustrated in FIG. 1. The hardware configuration of the image processing apparatus 10 of the second exemplary embodiment is identical to that of the image processing apparatus 10 illustrated in FIG. 2. The hardware configuration of the management server 20 of the second exemplary embodiment is identical to that of the management server 20 of FIG. 3. The detailed description of these apparatuses is omitted herein.

Upon detecting unauthorized use using the terminal ID or the user ID in the image processing system of the second exemplary embodiment, the image processing apparatus 10 transmits to the management server 20 the use suspension request against the unauthorized use of the service. The management server 20 modifies the services available using the terminal ID or the user ID.

FIG. 8 is a functional block diagram illustrating the image processing system of the second exemplary embodiment. As illustrated in FIG. 8, the image processing apparatus 10 includes use suspension receiving unit 41, use suspension information memory 42, use permission determination unit 43, unauthorized use detector 44, process controller 45, setting information memory 46, and use suspension requesting unit 48. The management server 20 includes management information memory 51, management information providing unit 52, and management information updating unit 53.

The elements and memory of the image processing apparatus 10 are described below.

The use suspension receiving unit 41 receives the terminal ID or the user ID notified by the image processing apparatus 10 used in an unauthorized fashion and a use suspension service.

The use suspension information memory 42 stores the terminal ID or the user ID and the use suspension service received by the use suspension receiving unit 41.

The use permission determination unit 43, the unauthorized use detector 44, and the process controller 45 have substantially identical in function to those in the first exemplary embodiment, and the discussion thereof is omitted herein.

The setting information memory 46 stores setting information that associates an unauthorized use item with a use suspension service.

The use suspension requesting unit 48 notifies the management server 20 of the suspension request of the use of the image processing apparatus 10 responsive to the use request using the terminal ID or the user ID recognized by the use permission determination unit 43. If the notification of the suspension request to the management server 20 fails, the use suspension requesting unit 48 searches for another image processing apparatus 10 present over the network, and notifies a found image processing apparatus 10 of the suspension request of the use responsive to the use request using the terminal ID or the user ID. If the connection to the management server 20 is verified, the use suspension requesting unit 48 again notifies the management server 20 of the suspension request of the use of the other image processing apparatus 10 responsive to the use request using the terminal ID or the user ID. The use suspension requesting unit 48 requests the other image processing apparatus 10, to which the suspension request has been made, to place an inquiry to the management server 20. In the second exemplary embodiment, the suspension request of the use notified to the management server 20 is a request to delete a service that is to be executed in the unauthorized use detected by the unauthorized use detector 44, from the services associated with the terminal ID or the user ID recognized by the use permission determination unit 43. The service that is to be executed in the unauthorized use detected by the unauthorized use detector 44 may be a service associated with the unauthorized use item in the setting information stored on the setting information memory 46. In the second exemplary embodiment, the use suspension requesting unit 48 is provided as an example of a providing unit that provides information that limits the use of the other image processing apparatus responsive to the use request including the identification information, and an example of a notifying unit that notifies the management apparatus of limitation information that limits the use of the multiple image processing apparatuses responsive to the use request including the identification information.

These elements and memories described above are implemented when software resources and hardware resources operate in cooperation. More specifically, the CPU 11 (see FIG. 2) reads from the ROM 13 (see FIG. 2) onto the RAM 12 (see FIG. 2) a program that implements the use suspension receiving unit 41, the use permission determination unit 43, the unauthorized use detector 44, the process controller 45, and the use suspension requesting unit 48. The CPU 11 then executes the program, thereby implementing the elements. The use suspension information memory 42 and the setting information memory 46 are implemented by the HDD 14 (see FIG. 2), for example.

The elements and memories of the management server 20 are substantially identical in function to the management information memory 51, the management information providing unit 52, and the management information updating unit 53 described with reference to the first exemplary embodiment, and the discussion thereof is omitted herein.

These elements and memories described above are implemented when software resources and hardware resources operate in cooperation. More specifically, the CPU 21 (see FIG. 3) reads from the HDD 23 (see FIG. 3) onto the memory 22 (see FIG. 3) a program that implements the management information providing unit 52 and the management information updating unit 53. The CPU 21 then executes the program, thereby implementing the elements. The management information memory 51 is implemented by the HDD 23 (see FIG. 3), for example.

FIG. 9 illustrates an example of setting information stored on the setting information memory 46 of FIG. 8. As illustrated in FIG. 9, the setting information associates the unauthorized use item with the use suspension service. The unauthorized use item indicates specific contents of the unauthorized use of the image processing apparatus 10. The use suspension service is a service that is to be suspended if the unauthorized use item is used in an unauthorized fashion.

FIG. 10 illustrates an example of the management information stored on the management information memory 51 of FIG. 8. The management information of FIG. 10 is identical to the management information of FIG. 5 except that FIG. 10 includes as the example of service the use suspension service of FIG. 9.

The operation of the image processing apparatus 10 of the second exemplary embodiment is described. The operation of the image processing apparatus 10 is substantially identical to the operation of FIG. 6 from when the use request of the use of the image processing apparatus 10 using the terminal ID or the user ID is received to when the unauthorized use of the image processing apparatus 10 is detected. The determination method of determining in step S102 whether the use of the image processing apparatus 10 is permitted and the service identification method in step S103 are different from those illustrated in FIG. 6. These differences are described below.

The determination in step 3102 is performed as below in the second exemplary embodiment. Based on the management information stored on the management information memory 51, the use permission determination unit 43 determines whether the use of the image processing apparatus 10 is permitted. More specifically, the use permission determination unit 43 determines whether the image processing apparatus 10 is usable, depending on whether the user permission "granted" is registered in the terminal ID or the user ID specified in step S101 in the management information that the management information providing unit 52 provides in response to the inquiry to the management server 20.

The service identification method in step S103 may be performed in the second exemplary embodiment as below. The use permission determination unit 43 determines which of the management information stored on the management information memory 51 and the use suspension information stored on the use suspension information memory 42 is to be referenced. The use permission determination unit 43 stores the management information as default information to be referenced. If information specifying that the use suspension information is to be referenced is notified in step S325 of FIG. 11 or information specifying that the management information is to be referenced is notified in step S328 of FIG. 11, the use permission determination unit 43 stores the notified information instead of the default information. The use permission determination unit 43 simply determines which information, the management information or the use suspension information, is to be referenced, based on the stored information therewithin. Upon determining that that the management information is to be referenced, the use permission determination unit 43 determines the service whose use is permitted in the image processing apparatus 10, based on the management information stored on the management information memory 51. More specifically, the use permission determination unit 43 identifies as a permitted service a service associated with the terminal ID or the user ID specified in step S101 in the management information that the management information providing unit 52 provides in response to the inquiry to the management server 20. Upon determining that the use suspension information is to be referenced, the use permission determination unit 43 determines a service whose use is to be permitted in the image processing apparatus 10, based on the use suspension information stored on the use suspension information memory 42. More specifically, the use permission determination unit 43 identifies as the permitted service a service not associated with the terminal ID or the user ID specified in step S101.

FIG. 11 is a flowchart illustrating the subsequent operation of the image processing apparatus 10.

As illustrated in FIG. 11, the use suspension requesting unit 48 in the image processing apparatus 10 identifies the service whose use is to be suspended if unauthorized use is detected in step S105 (step S321). More specifically, the use suspension requesting unit 48 references the setting information stored on the setting information memory 46, and identifies the use suspension service associated with the unauthorized use item detected in step S105 in the setting information.

The use suspension requesting unit 48 notifies the management server 20 of the suspension request of the use of the service in accordance with the terminal ID or the user ID specified in step S101 (step S322). The use suspension requesting unit 48 determines whether the notification to the management server 20 has been successfully performed (step S323). If the communication network 80 malfunctions, the management server 20 may not be successfully notified. Upon determining in step S323 that the notification to the management server 20 has been successfully performed, the use suspension requesting unit 48 ends the process. The management information updating unit 53 in the management server 20 updates the management information stored on the management information memory 51 in response to the suspension request notified by the image processing apparatus 10. More specifically, the management information updating unit 53 deletes the service identified in step S321 from the management information. For example, with the setting information of FIG. 9 stored on the setting information memory 46, and the management information of FIG. 10 stored on the management information memory 51, the unauthorized use "transfer of an in-house document to an external server" may now be performed using the terminal ID "tablet1". In such a case, the management information updating unit 53 deletes a "transfer service to external server" and a "mail transmission to external address" from the services associated with the terminal ID "tablet1", but service "printing document of document management server" remains as a service associated with the terminal ID "tablet1".

Upon determining in step S323 that the notification to the management server 20 has not been successfully performed, the use suspension requesting unit 48 searches for another image processing apparatus 10 on which the service using the terminal ID or the user ID specified in step S101 is not desirable (step S324). The search method described with reference to the first exemplary embodiment may be used as the search method of the other image processing apparatus 10. The use suspension requesting unit 48 notifies the other image processing apparatus 10 found in step S324 of the terminal ID or the user ID specified in step S101 and the use suspension service identified in step S321 (step S325). The use suspension receiving unit 41 in the other image processing apparatus 10 receives the terminal ID or the user ID and the use suspension service from the image processing apparatus 10 that has been used in an unauthorized fashion, and stores the terminal ID or the user ID and the use suspension service on the use suspension information memory 42. The use suspension receiving unit 41 requests the use permission determination unit 43 to reference the use suspension information memory 42 when use permission determination unit 43 identifies the service in step S103.

The use suspension requesting unit 48 determines whether the notification to the management server 20 is possible or not (step S326). If the communication network 80 is restored from the malfunction, the notification to the management server 20 becomes possible. The use suspension requesting unit 48 repeats the operation in step S326 as long as the use suspension requesting unit 48 determines in step S326 that the notification to the management server 20 is not possible. Upon determining that the notification to the management server 20 is possible, the use suspension requesting unit 48 notifies the management server 20 of the suspension request of the use of the service using the terminal ID or the user ID specified in step S101 (step S327). The use suspension requesting unit 48 requests the use permission determination unit 43 to make an inquiry to the management server 20 when the use permission determination unit 43 identifies the service in step S103 (step S328).

In the second exemplary embodiment, the use suspension requesting unit 48 notifies the suspension request of the use of the service to the management server 20 or the other image processing apparatus 10, and the use permission determination unit 43 references the suspension request when the use permission determination unit 43 identifies the service that is to be permitted. The second exemplary embodiment may be modified. In a manner similar to the first exemplary embodiment, the use suspension requesting unit 48 may notify the suspension request of the use of the image processing apparatus 10 to the management server 20 or the other image processing apparatus 10, and the use permission determination unit 43 may reference the suspension request when the use permission determination unit 43 determines whether the image processing apparatus 10 is permitted.

Third Exemplary Embodiment

The general configuration of the image processing system of a third exemplary embodiment is identical to that of the first exemplary embodiment illustrated in FIG. 1. The hardware configuration of the image processing apparatus 10 of the third exemplary embodiment is identical to that of the image processing apparatus 10 illustrated in FIG. 2. The hardware configuration of the management server 20 of the third exemplary embodiment is identical to that of the management server 20 of FIG. 3. The detailed description of these apparatuses is omitted herein.

Upon detecting unauthorized use using the terminal ID or the user ID in the image processing system of the third exemplary embodiment, the image processing apparatus 10 determines whether a detection count of unauthorized use is above a maximum warning count. Upon determining that the detection count of unauthorized use is above the maximum warning count, the image processing apparatus 10 transmits to the management server 20 an update request of the detection count and the suspension request of the unauthorized use of the service. The management server 20 updates the detection count and changes the services available using the terminal ID or the user ID. Upon determining that the detection count of unauthorized use is not above the maximum warning count, the image processing apparatus 10 transmits the update request of the detection count to the management server 20, and the management server 20 updates the detection count.

FIG. 12 is a functional block diagram of the image processing system of the third exemplary embodiment of the present invention. As illustrated in FIG. 12, the image processing apparatus 10 includes use suspension receiving unit 41, use suspension information memory 42, use permission determination unit 43, unauthorized use detector 44, process controller 45, setting information memory 46, detection count measurement unit 47, and use suspension requesting unit 48. The management server 20 includes management information memory 51, management information providing unit 52, and management information updating unit 53.

The elements and memories of the image processing apparatus 10 are described below.

The use suspension receiving unit 41 and the use suspension information memory 42 are substantially identical in function to those in the second exemplary embodiment, and the discussion thereof is omitted herein.

The use permission determination unit 43, the unauthorized use detector 44, and the process controller 45 are substantially identical in function to those described in the first exemplary embodiment, and the discussion thereof is omitted herein.

The setting information memory 46 stores setting information that associates the unauthorized use item, the use suspension service, and the maximum warning count.

The use permission determination unit 43 measures the detection count of the unauthorized use detected by the unauthorized use detector 44. The detection count measurement unit 47 determines whether the detection count is above the maximum warning count included in the setting information stored on the setting information memory 46. Upon determining that the detection count is not above the maximum warning count, the detection count measurement unit 47 displays a warning on the operation panel 15 and notifies the management server 20 of an update request of the detection count. Upon determining that the detection count is above the maximum warning count, the detection count measurement unit 47 notifies the management server 20 of the update request of the detection count, and then instructs the use suspension requesting unit 48 to notify of the suspension request of the use.

The use suspension requesting unit 48 is substantially identical in function to the use suspension requesting unit 48 in the second exemplary embodiment, and the discussion thereof is omitted herein.

These elements and memories described above are implemented when software resources and hardware resources operate in cooperation. More specifically, the CPU 11 (see FIG. 2) reads from the ROM 13 (see FIG. 2) onto the RAM 12 (see FIG. 2) a program that implements the use suspension receiving unit 41, the use permission determination unit 43, the unauthorized use detector 44, the process controller 45, the detection count measurement unit 47, and the use suspension requesting unit 48. The CPU 11 then executes the program, thereby implementing the elements. The use suspension information memory 42, and the setting information memory 46 are implemented by the HDD 14 (see FIG. 2), for example.

The elements and memory of the management server 20 are described below.

The management information memory 51 stores management information that associates the terminal ID, The user ID, the service, the use permission, and the detection count. In the third exemplary embodiment, the management information memory 51 serves as an example of a storage unit storing the limitation information.

The management information providing unit 52 supplies the image processing apparatus 10 with the management information stored on the management information memory 51.

The management information updating unit 53 updates the management information stored on the management information memory 51 in response to an instruction from the image processing apparatus 10.

These elements and memories described above are implemented when software resources and hardware resources operate in cooperation. More specifically, the CPU 21 (see FIG. 3) reads from the HDD 23 (see FIG. 3) onto the memory 22 (see FIG. 3) a program that implements the management information providing unit 52 and the management information updating unit 53. The CPU 21 then executes the program, thereby implementing the elements. The management information memory 51 is implemented by the HDD 23 (see FIG. 3), for example.

FIG. 13 illustrates an example of the setting information stored on the setting information memory 46 of FIG. 12. As illustrated in FIG. 13, the setting information associates the unauthorized use item, the use suspension service, and the maximum warning count. The unauthorized use item indicates specific contents of the unauthorized use of the image processing apparatus 10. The use suspension service indicates a service that is to be suspended if the unauthorized use of the corresponding to the unauthorized use item is performed. The maximum warning count indicates a maximum number of times by which a warning is performed until the use of the service is suspended if the unauthorized use of the unauthorized use item is performed.

FIG. 14 illustrates an example of the management information stored on the management information memory 51 of FIG. 12. As illustrated in FIG. 14, the management information associates the terminal ID, the user ID, the service, the use permission, and the detection count. The terminal ID, the user ID, the service, and the use permission have been described with reference to the first exemplary embodiment. On a per unauthorized use item basis, the detection count indicates the number of times by which the unauthorized use in accordance with the terminal ID or the user ID is detected.

The operation of the image processing apparatus 10 of the third exemplary embodiment is described below. The operation of the image processing apparatus 10 is substantially identical to the operation of FIG. 6 from when the use request of the use of the image processing apparatus 10 using the terminal ID or the user ID is received to when the process is suspended after the detection of the unauthorized use of the image processing apparatus 10. The determination method of determining in step S102 whether the use of the image processing apparatus 10 is permitted and the service identification method in step S103 are different from those illustrated in FIG. 6. These differences are described below.

The determination in step S102 is performed as below in the third exemplary embodiment. Based on the management information stored on the management information memory 51, the use permission determination unit 43 determines whether the use of the image processing apparatus 10 is permitted. More specifically, the use permission determination unit 43 determines whether the image processing apparatus 10 is usable, depending on whether the user permission "granted" is registered in the terminal ID or the user ID specified in step S101 in the management information that the management information providing unit 52 provides in response to the inquiry to the management server 20.

In the third exemplary embodiment, the service identification method in step S103 may be performed as below. The use permission determination unit 43 determines which of the management information stored on the management information memory 51 and the use suspension information stored on the use suspension information memory 42 is to be referenced. The use permission determination unit 43 stores the management information as default information to be referenced. If the information specifying that the use suspension information is to be referenced is notified in step S350 of FIG. 15B or the information specifying that the management information is to be referenced is notified in step S353 of FIG. 15B, the use permission determination unit 43 stores the notified information instead of the default information. The use permission determination unit 43 simply determines which information, the management information or the use suspension information, is to be referenced, based on the stored information therewithin. Upon determining that the management information is to be referenced, the use permission determination unit 43 determines the service whose use is permitted in the image processing apparatus 10, based on the management information stored on the management information memory 51. More specifically, the use permission determination unit 43 identifies as a permitted service a service associated with the terminal ID or the user ID specified in step S101 in the management information that the management information providing unit 52 provides in response to the inquiry to the management server 20. Upon determining that the use suspension information is to be referenced, the use permission determination unit 43 determines a service whose use is to be permitted in the image processing apparatus 10, based on the use suspension information stored on the use suspension information memory 42. More specifically, the use permission determination unit 43 identifies as the permitted service a service not associated with the terminal ID or the user ID specified in step S101.

Figure 15A:
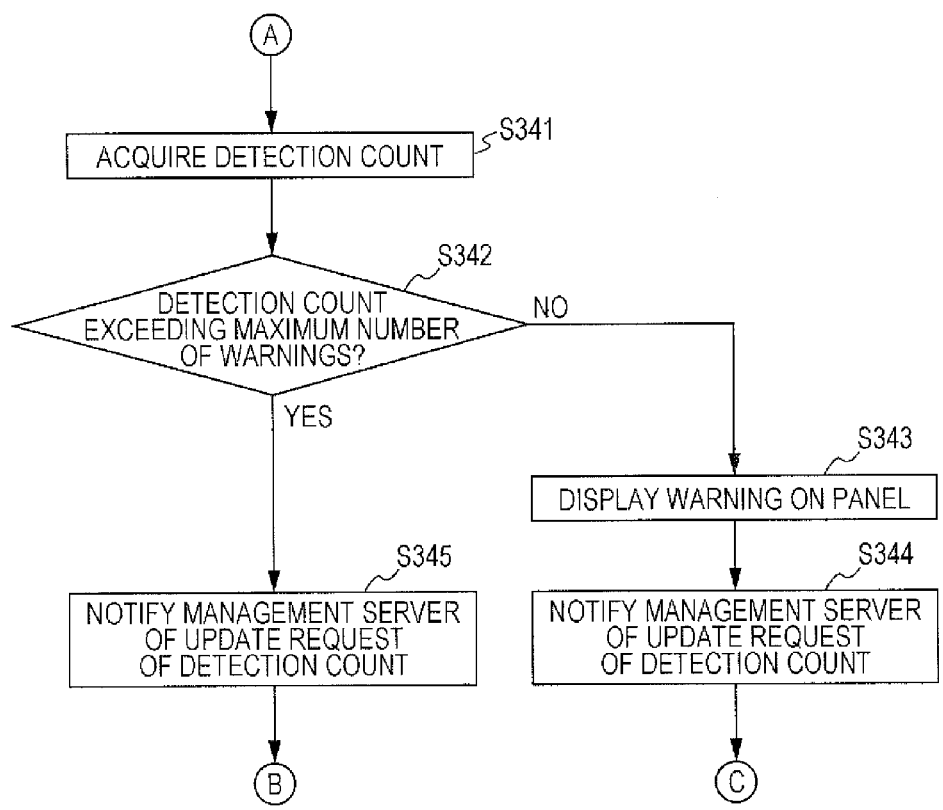
FIG. 15A is a flowchart illustrating an operation example of the image processing apparatus of the third exemplary embodiment of the present invention.
Figure 15B:
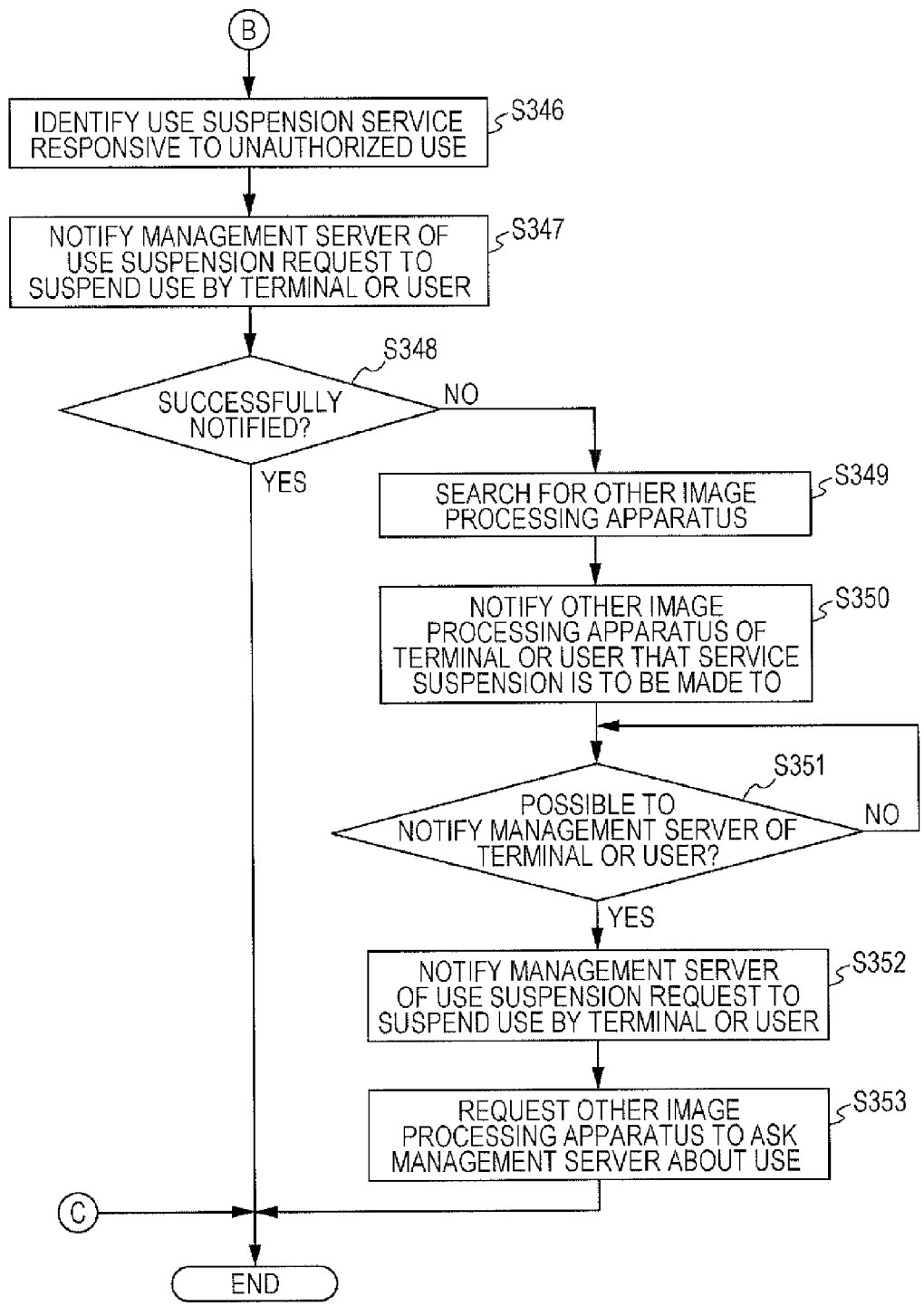
FIG. 15B is a continuation of the flowchart of FIG. 15A.

FIG. 15A and FIG. 15B are flowcharts of the subsequent operation of the image processing apparatus 10.

Referring to FIG. 15A, the detection count measurement unit 47 in the image processing apparatus 10 acquires the detection count of the unauthorized use (step S341). More specifically, the management information providing unit 52 provides the management information by placing the inquiry to the management server 20, and the detection count measurement unit 47 acquires the detection count from the management information, and increments the detection count by one. The detection count measurement unit 47 determines whether the resulting detection count has exceeded the maximum warning count included in the management information stored on the setting information memory 46 (step S342). If the use permission determination unit 43 determines that the resulting detection count has not exceeded the maximum warning count, the detection count measurement unit 47 displays a warning on the operation panel 15 (step S343). The detection count measurement unit 47 notifies the management server 20 of the update request of the detection count of the unauthorized use item detected in step S105 out of the detection counts corresponding to the terminal ID or the user ID specified in step S101 (step S344). The management information updating unit 53 in the management server 20 updates the management information stored on the management information memory 51 in response to the update request notified by the image processing apparatus 10. More specifically, the management information updating unit 53 overwrites the detection count with the detection count acquired in step S341.

Upon determining that the detection count acquired in step S341 is above the maximum warning count included in the setting information stored on the setting information memory 46, the detection count measurement unit 47 notifies the management server 20 of the update request of the detection count of the unauthorized use item detected in step S105, out of the detection counts corresponding to the terminal ID or the user ID specified in step S101 (step S345). The management server 20 updates the management information stored on the management information memory 51 in accordance with the update request notified by the image processing apparatus 10. More specifically, the management information updating unit 53 overwrites the detection count with the detection count acquired in step S341. For example, with the setting information stored on the management information memory 51 as illustrated in FIG. 13, and the management information stored on the setting information memory 46 as illustrated in FIG. 14, the unauthorized use "print request of a confidential document" may be performed using the terminal ID "tablet1". The management information updating unit 53 rewrites the detection count corresponding to the "print request of the confidential document" from "2" to "3" out of the detection counts corresponding to the terminal ID "tablet1" in the management information of FIG. 14.

Referring to FIG. 15B, the use suspension requesting unit 48 identifies the service whose use is to be suspended if unauthorized use is detected in step S105 (step S346). More specifically, the use suspension requesting unit 48 references the setting information stored on the setting information memory 46, and identifies the use suspension service associated with the unauthorized use item detected in step S105 in the setting information.

The use suspension requesting unit 48 notifies the management server 20 of the suspension request of the use in accordance with the terminal ID or the user ID specified in step S101 (step S347). The use suspension requesting unit 48 determines whether the notification to the management server 20 has been successfully performed (step S348). If the communication network 80 malfunctions, the management server 20 may not be successfully notified. Upon determining in step S348 that the notification to the management server 20 has been successfully performed, the use suspension requesting unit 48 ends the process. The management information updating unit 53 in the management server 20 updates the management information stored on the management information memory 51 in response to the suspension request notified by the image processing apparatus 10. More specifically, the management information updating unit 53 deletes the service identified in step S346 from the management information. For example, with the setting information of FIG. 13 stored on the setting information memory 46, and with the management information of FIG. 14 stored on the management information memory 51, the unauthorized use "print request of the confidential document" may now be performed using the terminal. ID "tablet1". In such a case, the management information updating unit 53 deletes the "printing of document of document management server" from the services associated with the terminal ID "tablet1", and services "transfer service to the external server" and "mail transmission to the external address" remain as services associated with the terminal ID "tablet1".

Upon determining that the notification to the management server 20 has not been successfully performed, the use suspension requesting unit 48 searches for another image processing apparatus 10 on which the service using the terminal ID or the user ID specified in step S101 is not desirable (step S349). The search method described with reference to the first exemplary embodiment may be used as the search method of the other image processing apparatus 10. The use suspension requesting unit 48 notifies the other image processing apparatus 10 found in step S349 of the terminal ID or the user ID specified in step S101 and the use suspension service identified in step S346 (step S350). The use suspension receiving unit 41 in the other image processing apparatus 10 receives the terminal ID or the user ID and the use suspension service from the image processing apparatus 10 that has been used in an unauthorized fashion, and stores the terminal ID or the user ID and the use suspension service on the use suspension information memory 42. The use suspension receiving unit 41 requests the use permission determination unit 43 to reference the use suspension information memory 42 when the use permission determination unit 43 identifies the service in step S103.

The use suspension requesting unit 48 determines whether the notification to the management server 20 is possible or not (step S351). If the communication network 80 is restored from the malfunction, the notification to the management server 20 becomes possible. The use suspension requesting unit 48 repeats the operation in step S351 as long as the use suspension requesting unit 48 determines in step S351 that the notification to the management server 20 is not possible. Upon determining that the notification to the management server 20 is possible, the use suspension requesting unit 48 notifies the management server 20 of the suspension request of the use of the service using the terminal ID or the user ID specified in step S101 (step S352). The use suspension requesting unit 48 requests the use permission determination unit 43 to make an inquiry to the management server 20 when the use permission determination unit 43 identifies the service in step S103 (step S353).

In the third exemplary embodiment, the use suspension requesting unit 48 notifies the suspension request of the use of the service to the management server 20 or the other image processing apparatus 10, and the use permission determination unit 43 references the suspension request when the use permission determination unit 43 identifies the service that is to be permitted. The third exemplary embodiment may be modified. In a manner similar to the first exemplary embodiment, the use suspension requesting unit 48 may notify the suspension request of the use of the image processing apparatus 10 to the management server 20 or the other image processing apparatus 10, and the use permission determination unit 43 may reference the suspension request when the use permission determination unit 43 determines whether the image processing apparatus 10 is usable.

In the third exemplary embodiment, failure to notify the management server 20 of the update request of the detection count is not considered. With the failure to notify the management server 20 of the update request of the detection count considered, the other image processing apparatus 10 may be notified of the detection count.

Fourth Exemplary Embodiment

FIG. 16 generally illustrates the image processing system of a fourth exemplary embodiment. Referring to FIG. 16, the image processing system includes image processing apparatuses 10a through 10c, management server 20, cloud server 30, and communication network 80 connecting these elements. Although the image processing apparatuses 10a through 10c are illustrated in FIG. 16, they may be collectively referred to as an image processing apparatus 10. Referring to FIG. 16, the number of image processing apparatuses 10 is three, but four or more image processing apparatuses 10 may be included.

The image processing apparatus 10 performs at least one of the following operations including forming an image on a recording medium, such as a paper sheet, reading an image from a recording medium, receiving an image from a public network, and transmitting an image to the public network. From the viewpoint of image forming, the image processing apparatus 10 is a printer. From the viewpoint of image reading, the image processing apparatus 10 is a scanner. From the viewpoint of image reading and image forming, the image processing apparatus 10 is a copying machine. From the viewpoint of image reading and image transmission, the image processing apparatus 10 is a facsimile transmitter. From the viewpoint of image reception and image forming, the image processing apparatus 10 is a facsimile receiver.

The management server 20 is a server computer that manages the image processing apparatus 10 while also managing connection to the cloud server 30. The management server 20 manages a terminal apparatus or a user using the image processing apparatus 10, receives an inquiry from the image processing apparatus 10 specifying the terminal apparatus or the user, and then replies to the image processing apparatus 10 as to whether to permit the terminal apparatus or the user to use the image processing apparatus 10. The management server 20 manages a terminal apparatus or a user configured to connect to the cloud server 30, receives an inquiry from the image processing apparatus 10 specifying the terminal apparatus or the user, and then replies to the image processing apparatus 10 as to whether to permit the image processing apparatus 10 to be connected to the cloud server 30 in response to an instruction from the terminal apparatus or the user.

The cloud server 30 is a server computer that provides the image processing apparatus 10 with a variety of cloud services. For example, the cloud services may include a translation cloud service that translates a document read in a first language on the image processing apparatus 10 into text data in a second language, and a storage cloud service that stores, on a memory, data input from the image processing apparatus 10.

The communication network 80 is used to help exchange information among the image processing apparatus 10, the management server 20, and the cloud server 30. For example, the communication network 80 may be the Internet.

The hardware configuration of the image processing apparatus 10 of the fourth exemplary embodiment is identical to that of the image processing apparatus 10 illustrated in FIG. 2. The hardware configuration of the management server 20 of the fourth exemplary embodiment is identical to that of the management server 20 of FIG. 3. The hardware configuration of the management server 20 of FIG. 3 may also serve as that of the cloud server 30. The detailed discussion of these apparatuses is omitted herein.

In the image processing system of the fourth exemplary embodiment thus constructed, the image processing apparatus 10 asks the management server 20 whether an operation mode of the terminal ID or the user ID is job or private, in response to a connection request to connect to the cloud server 30 in accordance with the terminal ID or the user ID. By checking the operation mode with the operation mode of the connection request, the image processing apparatus 10 permits or denies the connection to the cloud server 30.

Figure 17:
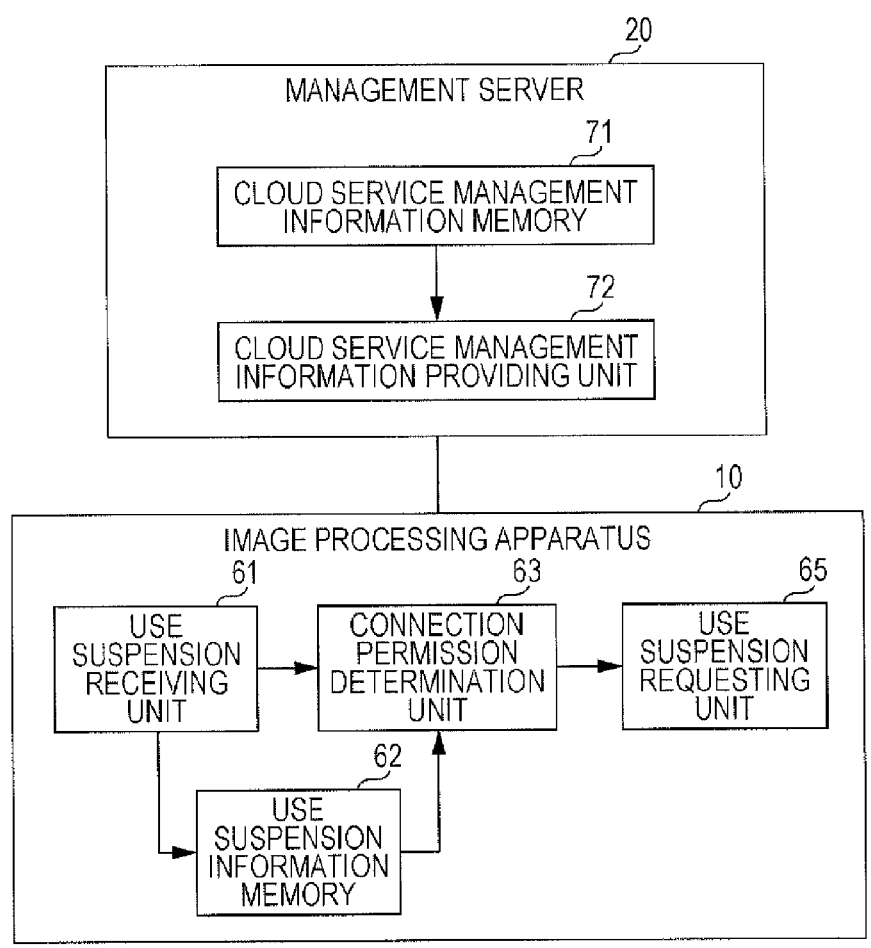
FIG. 17 is a functional block diagram of the image processing system of the fourth exemplary embodiment of the present invention.

FIG. 17 is a functional block diagram of the image processing system of the fourth exemplary embodiment. As illustrated in FIG. 17, the image processing apparatus 10 includes use suspension receiving unit 61, use suspension information memory 62, connection permission determination unit 63, and use permission requesting unit 65. The management server 20 includes cloud service management information memory 71, and cloud service management information providing unit 72.

The elements and memory of the image processing apparatus 10 are described below.

The use suspension receiving unit 61 and the use suspension information memory 62 are substantially identical in function to the use suspension receiving unit 41 and the use suspension information memory 42, respectively, and the discussion thereof is omitted herein.

The connection permission determination unit 63 determines whether a log-in using the terminal ID or the user ID is possible. Upon determining that the log-in using the terminal ID or the user ID is possible, the connection permission determination unit 63 determines whether a condition is satisfied or not. The condition is whether an entry corresponding to the terminal ID or the user ID is present in the cloud management service information of the management server 20, a cloud service uniform resource locator (URL) is present in the entry, and the current operation mode matches the operation mode in the entry. If the condition is satisfied, the connection permission determination unit 63 permits the connection to the cloud server 30. If the condition is not satisfied, the connection permission determination unit 63 denies the connection to the cloud server 30 and then instructs the use permission requesting unit 65 to notify the suspension request of the use. In the fourth exemplary embodiment, the cloud server 30 is used for an example of another function providing apparatus. The connection permission determination unit 63 serves as an example of a receiving unit that receives a use request to use the function providing apparatus to connect the function providing apparatus to the other function providing apparatus, an example of a denial unit that denies use of the function providing apparatus to connect the function providing apparatus to the other function providing apparatus if the connection of the function providing apparatus to the other function providing apparatus is not permitted, or an example of a controller that performs control to limit the use of the function providing apparatus in response to the use request including the identification information.

The use permission requesting unit 65 is substantially identical in function to the use suspension requesting unit 48 described with reference to the first exemplary embodiment, and the discussion thereof is omitted herein.

These elements and memories described above are implemented when software resources and hardware resources operate in cooperation. More specifically, the CPU 11 (see FIG. 2) reads from the ROM 13 (see FIG. 2) onto the RAM 12 (see FIG. 2) a program that implements the use suspension receiving unit 61, the connection permission determination unit 63, and the use permission requesting unit 65. The CPU 11 then executes the program, thereby implementing the elements. The use suspension information memory 62 is implemented by the HDD 14 (see FIG. 2), for example.

The elements and memory of the management server 20 are described below.

The cloud service management information memory 71 stores cloud service management information that associates the terminal ID, the user ID, the cloud service URL, the cloud user ID, and the operation mode.

The cloud service management information providing unit 72 provides the image processing apparatus 10 with the cloud service management information stored on the cloud service management information memory 71.

These elements and memories described above are implemented when software resources and hardware resources operate in cooperation. More specifically, the CPU 21 (see FIG. 3) reads from the HDD 23 (see FIG. 3) onto the memory 22 (see FIG. 3) a program that implements the cloud service management information providing unit 72. The CPU 21 then executes the program, thereby implementing the elements. The cloud service management information memory 71 is implemented by the HDD 23 (see FIG. 3), for example.

FIG. 18 illustrates an example of the cloud service management information stored on the cloud service management information memory 71 of FIG. 17. As illustrated in FIG. 18, the cloud service management information associates the terminal ID, the user ID, the cloud service URL, the cloud user ID, and the operation mode. As described above, the terminal ID indentifies each terminal apparatus. The user ID identifies each user. The cloud service URL is a URL of a cloud service provided by the cloud server 30. The cloud user ID is a user identification that is used when the cloud service of the cloud service URL corresponding to the terminal ID or the user ID is used. The operation mode indicates whether the connection to the cloud service URL corresponding to the terminal ID or the user ID is performed on a job basis or a private basis.

Figure 19:
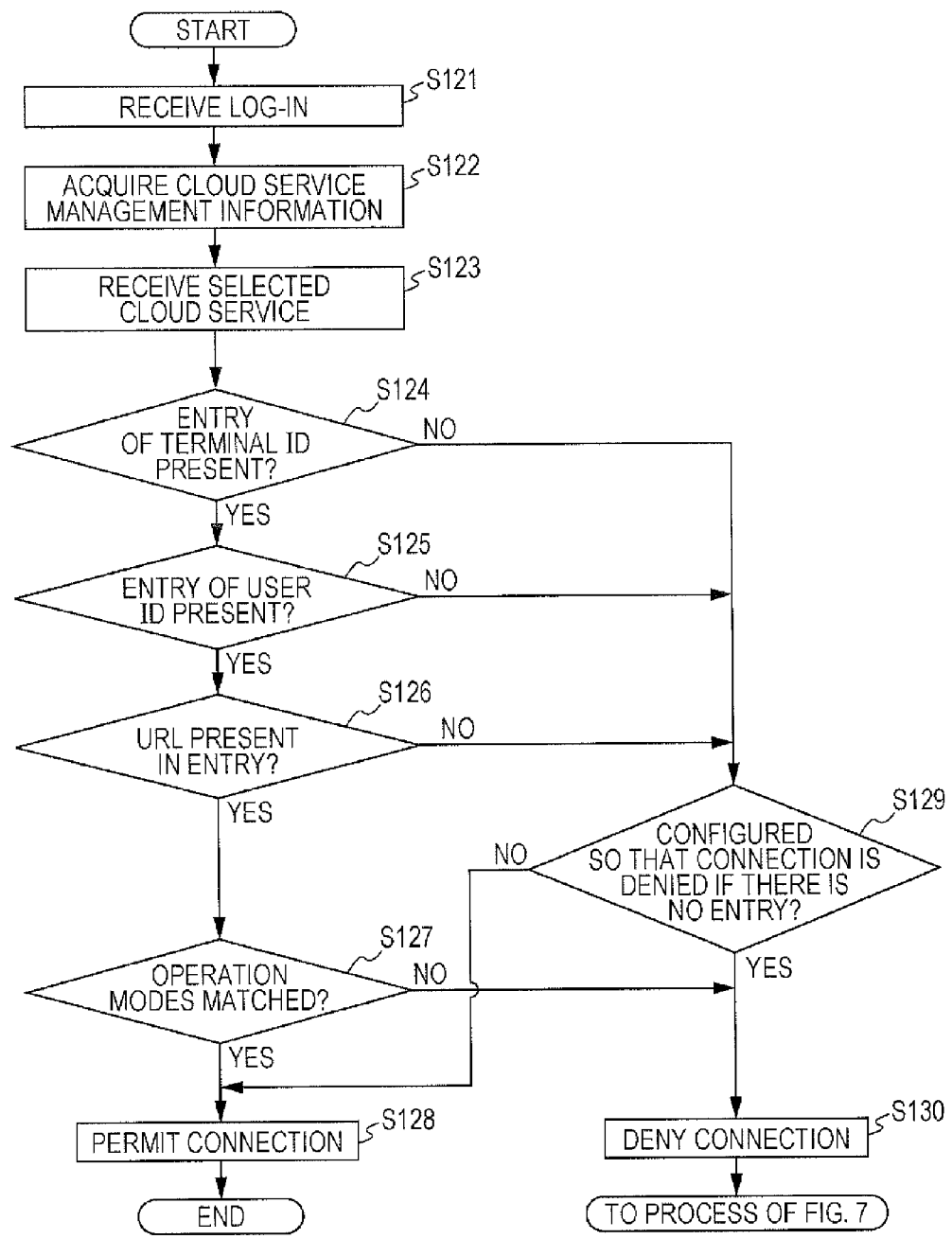
FIG. 19 is a flowchart illustrating an operation example of the image processing apparatus of the fourth exemplary embodiment of the present invention.

The operation of the image processing apparatus 10 of the fourth exemplary embodiment is described below. FIG. 7 and FIG. 19 are flowcharts illustrating an operation example of the image processing apparatus 10 of the fourth exemplary embodiment.

Referring to FIG. 19, the connection permission determination unit 63 in the image processing apparatus 10 receives a log-in using the terminal ID or the user ID (step S121). In this step, the connection permission determination unit 63 determines whether the log-in using the terminal ID or the user ID is permitted. Upon determining that the log-in is not permitted, the connection permission determination unit 63 repeats the operation in step S121. Upon determining that the log-in is permitted, the connection permission determination unit 63 proceeds to step S122.

The determination as to whether the log-in is permitted may be performed as described below in the fourth exemplary embodiment. The connection permission determination unit 63 determines which of the management information (see FIG. 5) in the management server 20 and the use suspension information stored on the use suspension information memory 62 is to be referenced. The connection permission determination unit 63 stores, as default information, information specifying that the management information is to be referenced. If the information specifying that the use suspension information is to be referenced is notified in step S304 of FIG. 7, or the information specifying that the management information is to be referenced is notified in step S307 of FIG. 7, the connection permission determination unit 63 stores the notified information instead of the default information. The determination as to which of the management information and the use suspension information is to be referenced may be performed based on the stored information. If the management information is to be referenced, the connection permission determination unit 63 determines whether the log-in is permitted, based on the management information on the management server 20. More specifically, the connection permission determination unit 63 determines whether the log-in is permitted, based on whether the use permission "granted" is registered at the terminal ID or the user ID specified in step S121 in the management information. If the use suspension information is to be referenced, the connection permission determination unit 63 determines whether the log-in is permitted, based on the use suspension information stored on the use suspension information memory 62. More specifically, the connection permission determination unit 63 determines whether the log-in is permitted, based on whether the terminal ID or the user ID specified in step S121 is stored as the use suspension information.

The connection permission determination unit 63 acquires from the management server 20 the cloud service management information stored on the cloud service management information memory 71 (step S122). The connection permission determination unit 63 receives a user operation that selects a cloud service the user desires on a list of cloud services (step S123). The cloud service URL corresponding to the selected cloud service is also identified.

The connection permission determination unit 63 determines whether the entry corresponding to the terminal ID specified in step S121 is present in the cloud service management information (step S124). The connection permission determination unit 63 proceeds to step S125 upon determining that the entry corresponding to the terminal ID specified in step S121 is present in the cloud service management information. The connection permission determination unit 63 also proceeds to step S125 if the terminal ID is not notified during the log-in, such as if the user directly logs in on the operation panel 15.

The connection permission determination unit 63 determines whether the entry corresponding to the user ID specified in step S121 is present in the cloud service management information (step S125). The connection permission determination unit 63 proceeds to step S126 upon determining that the entry corresponding to the user ID specified in step S121 is present in the cloud service management information. The connection permission determination unit 63 also proceeds to step S126 if the terminal ID is not notified, such as if the user directly logs in on the operation panel 15. The connection permission determination unit 63 also proceeds to step S126 if the terminal ID is not notified during the log-in, such as if the log-in is performed with the terminal ID from the terminal apparatus.

The connection permission determination unit 63 determines whether the cloud service URL identified in step S123 is present in the entry verified at least one of step S124 and S125 (step S126). The connection permission determination unit 63 proceeds to step S127 upon determining that the cloud service URL is present in one of the entries.

The connection permission determination unit 63 determines whether the current operation mode matches the operation mode in the entry where the cloud service URL is determined in step S126 to be present (step S127). The current operation mode may be determined as described below. If the log-in is directly performed from the operation panel 15, the operation mode may be a job mode. If the log-in is performed using the terminal apparatus, the current operation mode is the mode that the user specifies on the screen of the terminal apparatus. Upon determining in step S127 that the current operation mode matches the operation mode in the entry, the connection permission determination unit 63 permits the connection to the cloud service URL (step S128). With the cloud service management information of FIG. 18 stored on the cloud service management information memory 71, the user may now log in on the operation panel 15 using a user ID "usr12345", and may request the connection to a translation cloud service having a cloud service URL "https://www.translation.com/". Since the log-in is performed on the operation panel 15, the current operation mode is a job mode. The operation mode corresponding to the user ID "usr12345" and the cloud service URL "https://www.translation.com/" is also a job mode. The connection to the cloud service URL is thus permitted.

If the entry satisfying the condition in step S124 or step S126 is not present in the cloud service management information, the connection permission determination unit 63 determines whether setting is configured to deny the connection if there is no entry (step S129). If the setting is not configured to deny the connection, the connection permission determination unit 63 grants the connection to the cloud service URL (step S128). The connection may be granted by imparting a guest right to the terminal ID or the user ID specified in step S121.

Upon determining in step S129 that the setting is configured to deny if there is not no entry, the connection permission determination unit 63 denies the connection to the cloud service URL (step S130). Upon determining in step S127 that the current operation mode fails to match the operation mode in the entry, the connection permission determination unit 63 denies the connection to the cloud service URL (step S130). With the cloud service management information of FIG. 18 stored on the cloud service management information memory 71, the user may now log in on the terminal apparatus of the terminal ID "tablet1", and may request the connection to the translation cloud service having the cloud service URL "https://www.translation.com/". If the private mode is specified in the terminal apparatus of the terminal ID "tablet1", the current operation mode is a private mode. Since the operation mode corresponding to the terminal ID "tablet1" and the cloud service URL "https://www.translation.com/" is a job mode, the connection to the cloud service URL is thus denied.

If the connection to the cloud service URL is denied, the use permission requesting unit 65 in the image processing apparatus 10 then performs the process of FIG. 7.

Fifth Exemplary Embodiment

The general configuration of the image processing system of a fifth exemplary embodiment is identical to that of the image processing system illustrated in FIG. 16. The hardware configuration of the image processing apparatus 10 of the fifth exemplary embodiment is identical to that of the image processing apparatus 10 illustrated in FIG. 2. The hardware configuration of the management server 20 of the third exemplary embodiment is identical to that of the management server 20 of FIG. 3. The hardware configuration of FIG. 3 may also be the hardware configuration of the cloud server 30. The detailed description of these apparatuses is omitted herein.

In the image processing system of the fifth exemplary embodiment thus constructed, the image processing apparatus 10 asks the management server 20 whether the operation mode of the terminal ID or the user ID is the job mode or private mode when a view request using the terminal ID or the user ID is made on the cloud server 30.

The image processing apparatus 10 permits or denies the view of information on the cloud server 30 by checking the operation mode against the operation mode of the view request.

Figure 20:
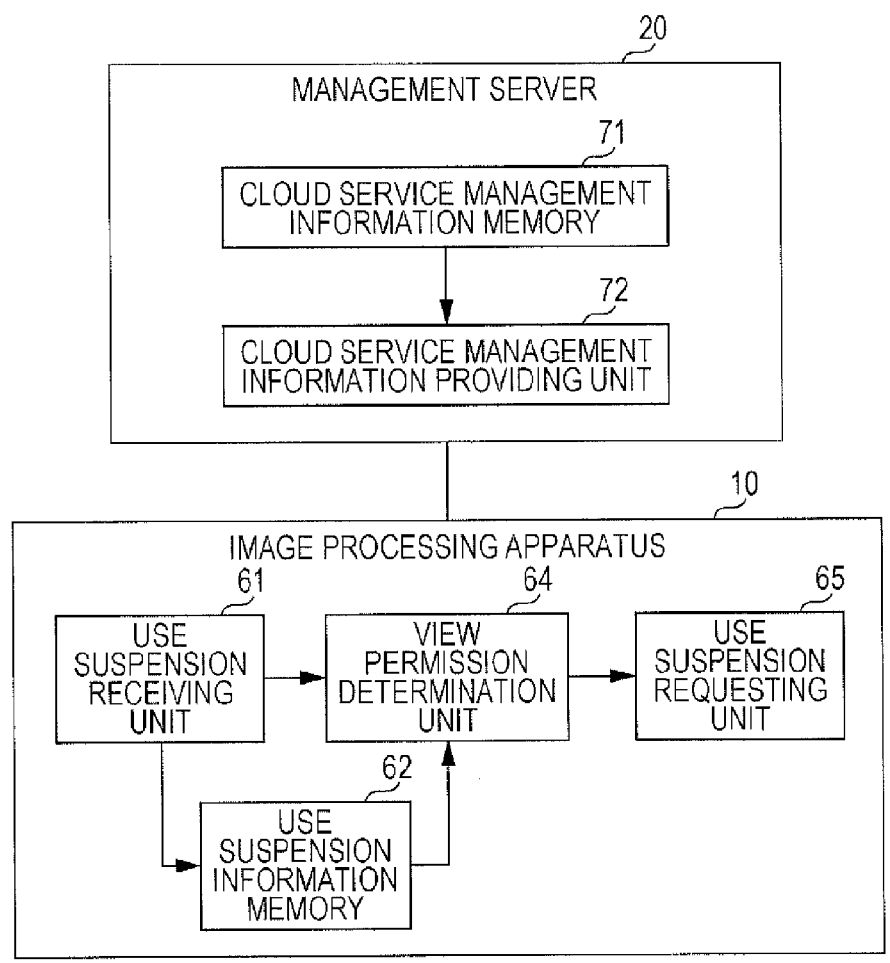
FIG. 20 is a functional block diagram of the image processing system of the fifth exemplary embodiment of the present invention.

FIG. 20 is a functional block diagram of the image processing system of the fifth exemplary embodiment. Referring to FIG. 20, the image processing apparatus 10 includes use suspension receiving unit 61, use suspension information memory 62, view permission determination unit 64, and use permission requesting unit 65. The management server 20 includes cloud service management information memory 71, and cloud service management information providing unit 72.

The elements and memory of the image processing apparatus 10 are described below.

The use suspension receiving unit 61 and the use suspension information memory 62 are substantially identical in function to the use suspension receiving unit 41 and the use suspension information memory 42, respectively, and the discussion thereof is omitted herein.

The view permission determination unit 64 determines whether a log-in using the terminal ID or the user ID is possible. Upon determining that the log-in using the terminal ID or the user ID is possible, the view permission determination unit 64 determines whether a condition is satisfied or not. The condition is whether an entry corresponding to the terminal ID or the user ID is present in the cloud management service information of the management server 20, a cloud service URL, the cloud user ID, and a view path is present in the entry, and the current operation mode matches the operation mode in the entry. If the condition is satisfied, the view permission determination unit 64 permits the view of information in a view path to the cloud server 30. If the condition is not satisfied, the view permission determination unit 64 denies the view of information in the view path to the cloud server 30 and then instructs the use permission requesting unit 65 to notify the suspension request of the use. In the fifth exemplary embodiment, the cloud server 30 is used for an example of another image processing apparatus. The view permission determination unit 64 serves as an example of a receiving unit that receives a use request to use the function providing apparatus to cause the function providing apparatus to view a memory area provided by the other function providing apparatus, an example of a denial unit that denies use of the function providing apparatus to cause the function providing apparatus to view the memory area of the other function providing apparatus if the function providing apparatus is not permitted to view the memory area of the other function providing apparatus, or an example of a controller that performs control to limit the use of the function providing apparatus in response to the use request including the identification information.

The use permission requesting unit 65 is substantially identical in function to the use suspension requesting unit 48 described with reference to the first exemplary embodiment, and the discussion thereof is omitted herein.

These elements and memories described above are implemented when software resources and hardware resources operate in cooperation. More specifically, the CPU 11 (see FIG. 2) reads from the ROM 13 (see FIG. 2) onto the RAM 12 (see FIG. 2) a program that implements the use suspension receiving unit 61, the view permission determination unit 64, and the use permission requesting unit 65. The CPU 11 then executes the program, thereby implementing the elements. The use suspension information memory 62 is implemented by the HDD 14 (see FIG. 2), for example.

The elements and memory of the management server 20 are described below.

The cloud service management information memory 71 stores cloud service management information that associates the terminal ID, the user ID, the cloud service URL, the cloud user ID, and the operation mode.

The cloud service management information providing unit 72 provides the image processing apparatus 10 with the cloud service management information stored on the cloud service management information memory 71.

These elements and memories described above are implemented when software resources and hardware resources operate in cooperation. More specifically, the CPU 21 (see FIG. 3) reads from the HDD 23 (see FIG. 3) onto the memory 22 (see FIG. 3) a program that implements the cloud service management information providing unit 72. The CPU 21 then executes the program, thereby implementing the elements. The cloud service management information memory 71 is implemented by the HDD 23 (see FIG. 3), for example.

FIG. 21 illustrates an example of the cloud service management information stored on the cloud service management information memory 71 of FIG. 20. As illustrated in FIG. 21, the cloud service management information associates the terminal ID, the user ID, the cloud service URL, the cloud user ID, the view path, and the operation mode. The terminal ID, the user ID, the cloud service URL, the cloud user ID have been described with reference to the first exemplary embodiment, and the discussion thereof is omitted herein. The view path indicates a storage location of the information that the cloud service allows the user to view. The operation mode indicates whether the view of the information in the view path corresponding to the cloud service of the cloud service URL is performed on a job basis or a private basis.

The operation of the image processing apparatus 10 of the fifth exemplary embodiment is described below. FIG. 7 and FIG. 22 are flowcharts illustrating an operation example of the image processing apparatus 10 of the fifth exemplary embodiment.

Referring to FIG. 22, the view permission determination unit 64 in the image processing apparatus 10 receives a log-in using the terminal ID or the user ID (step S141). In this step, the view permission determination unit 64 determines whether the log-in using the terminal ID or the user ID is permitted. Upon determining that the log-in is not permitted, the view permission determination unit 64 repeats the operation in step 9141. Upon determining that the log-in is permitted, the view permission determination unit 64 proceeds to step S142.

The determination as to whether the log-in is permitted may be performed as described below in the fifth exemplary embodiment. The view permission determination unit 64 determines which of the management information (see FIG. 5) on the management server 20 and the use suspension information stored on the use suspension information memory 62 is to be referenced. The view permission determination unit 64 stores, as default information, information specifying that the management information is to be referenced. If the information specifying that the use suspension information is to be referenced is notified in step S304 of FIG. 7, or the information specifying that the management information is to be referenced is notified in step S307 of FIG. 7, the view permission determination unit 64 stores the notified information instead of the default information. The determination as to which of the management information and the use suspension information is to be referenced may be performed based on the stored information. If the management information is to be referenced, the view permission determination unit 64 determines whether the log-in is permitted, based on the management information on the management server 20. More specifically, the view permission determination unit 64 determines whether the log-in is permitted, based on whether the use permission "granted" is registered at the terminal ID or the user ID specified in step S141 in the management information. If the use suspension information is to be referenced, the view permission determination unit 64 determines whether the log-in is permitted, based on the use suspension information stored on the use suspension information memory 62. More specifically, the view permission determination unit 64 determines whether the log-in is permitted, based on whether the terminal ID or the user ID specified in step S141 is stored as the use suspension information.

The view permission determination unit 64 acquires from the management server 20 the cloud service management information stored on the cloud service management information memory 71 (step S142). The view permission determination unit 64 receives a user operation that selects a cloud service the user desires on a list of cloud services (step S143). The cloud service URL corresponding to the selected cloud service is also identified.

The view permission determination unit 64 connects to the identified cloud service URL (step S144). The cloud user ID is then input, and is identified. The view permission determination unit 64 receives a user operation that selects a path the user desires on a list of view paths provided by the cloud service (step S145).

The view permission determination unit 64 determines whether the entry corresponding to the terminal ID specified in step S141 is present in the cloud service management information (step S146). The view permission determination unit 64 proceeds to step S147 upon determining that the entry corresponding to the terminal ID specified in step S141 is present in the cloud service management information. The view permission determination unit 64 also proceeds to step S147 if the terminal ID is not notified during the log-in, such as if the user directly logs in on the operation panel 15.

The view permission determination unit 64 determines whether the entry corresponding to the user ID specified in step S141 is present in the cloud service management information (step S147). The view permission determination unit 64 proceeds to step S148 upon determining that the entry corresponding to the user ID specified in step S141 is present in the cloud service management information. The view permission determination unit 64 also proceeds to step S148 if the terminal ID is not notified, such as if the log-in is performed on the terminal apparatus using the terminal ID.

The view permission determination unit 64 determines whether the cloud service URL identified in step S143, the cloud user ID identified in step S144, and the view path selected in step S145 are present at least in one of the entries verified in step S146 and step S147 (step S148). Upon determining that the cloud service URL, the cloud user ID, and the view path are present at least in one of the entries, the view permission determination unit 64 proceeds to step S149.

The view permission determination unit 64 determines whether the current operation mode matches the operation mode in the entry where the cloud service URL is determined in step S148 to be present (step S149). The current operation mode may be determined as described below. If the log-in is directly performed from the operation panel 15, the operation mode may be a job mode. If the log-in is performed using the terminal apparatus, the current operation mode is the mode that the user specifies on the screen of the terminal apparatus. Upon determining in step S149 that the current operation mode matches the operation mode in the entry, the view permission determination unit 64 permits the view of the information in the view path (step S150). With the cloud service management information of FIG. 21 stored on the cloud service management information memory 71, the user may now log in on the operation panel 15 using a user ID "usr12345", and may request information in a view path "official" to be viewed through a storage cloud service having a cloud service URL "https://www.storage.com/" connected at a cloud service user ID "hokan_fx". Since the log-in is performed on the operation panel 15, the current operation mode is a job mode. The operation mode corresponding to the user ID "usr12345", the cloud service URL "https://www.storage.com/", the cloud service user ID "hokan_fx", and the view path "official" is also a job mode in the cloud service management information of FIG. 21. The information in the view path is thus permitted.

If the entry satisfying the condition in step S146 through step S148 is not present in the cloud service management information, the view permission determination unit 64 determines whether setting is configured to deny the viewing if there is no entry (step S151). If the setting is not configured to deny the connection, the view permission determination unit 64 grants the viewing of the information in the view path (step S150).

Upon determining in step S151 that the viewing is configured to deny if there is not no entry, the view permission determination unit 64 denies the viewing of the information in the view path (step S152). Upon determining in step S149 that the current operation mode fails to match the operation mode in the entry, the view permission determination unit 64 denies the viewing of the information in the view path (step S152). With the cloud service management information of FIG. 21 stored on the cloud service management information memory 71, the user may now log in on the terminal apparatus of the terminal ID "tablet1", and may request information in a view path "official" to be viewed through the storage cloud service having the cloud service URL "https://www.storage.com/" connected at the cloud service user ID "hokan_fx". If the private mode is specified in the terminal apparatus of the terminal ID "tablet1", the current operation mode is a private mode. Since the operation mode corresponding to the terminal ID "tablet1", the cloud service URL "https://www.storage.com/", the cloud service user ID "hokan_fx", and the view path "official" is a job mode. The viewing of the information in the view path is thus denied.

If the viewing of the information the view path is denied, the use permission requesting unit 65 in the image processing apparatus 10 then performs the process of FIG. 7.

The program implementing the exemplary embodiments may be supplied not only via a communication medium, but also via a recording medium, such as a compact-disc read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A function providing apparatus comprising:
    a receiving unit that receives a use request to use the function providing apparatus, the use request including identification information identifying an operation unit to be operated to use the function providing apparatus, or a user using the function providing apparatus;
    a denial unit that, if the use request is to use the function providing apparatus in an unauthorized mode, denies use of the function providing apparatus in the unauthorized mode; and
    a providing unit that, if the use request is to use the function providing apparatus in the unauthorized mode, provides information that limits use of a different function providing apparatus responsive to the use request including the identification information,
    wherein the receiving unit receives as the use request a use request of the function providing apparatus to connect the function providing apparatus to the different function providing apparatus, and
    wherein the use of the function providing apparatus in the unauthorized mode is to connect the function providing apparatus to the different function providing apparatus if connection of the function providing apparatus to the different function providing apparatus is not permitted.

2. The function providing apparatus according to claim 1, wherein the providing unit provides a management apparatus managing the different function providing apparatus with the information that limits the use of the different function providing apparatus responsive to the use request including the identification information.

3. The function providing apparatus according to claim 2, wherein if the management apparatus fails to be provided with the information that limits the use of the different function providing apparatus responsive to the use request including the identification information, the providing unit provides the information to the different function providing apparatus.

4. The function providing apparatus according to claim 1, wherein the providing unit provides information that makes unusable a part of functions of the function providing apparatus in the unauthorized mode, among a plurality of functions provided by the different function providing apparatus.

5. The function providing apparatus according to claim 1, wherein if the number of use requests to use the function providing apparatus in the unauthorized mode exceeds a predetermined value, the providing unit provides the information that makes unusable the different function providing apparatus responsive to the use request including the identification information.

6. A function providing system, comprising:
a plurality of function providing apparatuses that provide functions; and
a management apparatus that manages the function providing apparatuses;
wherein a first function providing apparatus among the function providing apparatuses includes:
a receiving unit that receives a use request to use the function providing apparatus, the use request including identification information identifying an operation unit to be operated to use the first function providing apparatus, or a user using the first function providing apparatus;
a denial unit that, if the use request is intended to use the first function providing apparatus in an unauthorized mode, denies use of the function providing apparatus in the unauthorized mode; and
a notifying unit that, if the use request is to use the first function providing apparatus in the unauthorized mode, notifies the management apparatus of limitation information that limits use of the function providing apparatuses responsive to the use request including the identification information, and
wherein the management apparatus includes a storage unit that stores the limitation information, upon receiving the limitation information; and
wherein a second function providing apparatus among the function providing apparatuses includes a controller that, if the management apparatus stores the limitation information, performs control to limit the use of the second function providing apparatus responsive to the use request including the identification information,
wherein the receiving unit receives as the use request a use request of the function providing apparatus to connect the function providing apparatus to the different function providing apparatus, and
wherein the use of the function providing apparatus in the unauthorized mode is to connect the function providing apparatus to the different function providing apparatus if connection of the function providing apparatus to the different function providing apparatus is not permitted.

7. The function providing system according to claim 6, wherein the notifying unit in the first function providing apparatus notifies the second function providing apparatus of the limitation information in response to a failure to notify the management apparatus of the limitation information, and wherein in response to notification of the limitation information, the controller in the second function providing apparatus controls to limit the use of the second function providing apparatus responsive to the use request including the identification information.

8. A non-transitory computer readable medium storing a program causing a computer to execute a process for providing a function, the process comprising:
receiving a use request to use a function providing apparatus, the use request including identification information identifying an operation unit to be operated to use the function providing apparatus, or a user using the function providing apparatus;
denying use of the function providing apparatus in the unauthorized mode if the use request is to use the first function providing apparatus in an unauthorized mode; and
providing information that limits use of another function providing apparatus responsive to the use request including the identification information if the use request is to use the first function providing apparatus in an unauthorized mode,
wherein the receiving unit receives as the use request a use request of the function providing apparatus to connect the function providing apparatus to the different function providing apparatus, and
wherein the use of the function providing apparatus in the unauthorized mode is to connect the function providing apparatus to the different function providing apparatus if connection of the function providing apparatus to the different function providing apparatus is not permitted.

9. A function providing apparatus comprising:
a receiving unit that receives a use request to use the function providing apparatus, the use request including identification information identifying an operation unit to be operated to use the function providing apparatus, or a user using the function providing apparatus;
a denial unit that, if the use request is to use the function providing apparatus in an unauthorized mode, denies use of the function providing apparatus in the unauthorized mode; and
a providing unit that, if the use request is to use the function providing apparatus in the unauthorized mode, provides information that limits use of a different function providing apparatus responsive to the use request including the identification information,
wherein the receiving unit receives as the use request a use request of the function providing apparatus to cause the function providing apparatus to view a memory area provided by the different function providing apparatus, and
wherein the use of the function providing apparatus in the unauthorized mode is to cause the function providing apparatus to view the memory area if viewing of the memory area by the function providing apparatus is not permitted.

10. The function providing apparatus according to claim 9, wherein the providing unit provides a management apparatus managing the different function providing apparatus with the information that limits the use of the different function providing apparatus responsive to the use request including the identification information.

11. The function providing apparatus according to claim 10, wherein if the management apparatus fails to be provided with the information that limits the use of the different function providing apparatus responsive to the use request including the identification information, the providing unit provides the information to the different function providing apparatus.

12. The function providing apparatus according to claim 9, wherein the providing unit provides information that makes unusable a part of functions of the function providing apparatus in the unauthorized mode, among a plurality of functions provided by the different function providing apparatus.

13. The function providing apparatus according to claim 9, wherein if the number of use requests to use the function providing apparatus in the unauthorized mode exceeds a predetermined value, the providing unit provides the information that makes unusable the different function providing apparatus responsive to the use request including the identification information.

14. A function providing system, comprising:
- a plurality of function providing apparatuses that provide functions; and
- a management apparatus that manages the function providing apparatuses;
- wherein a first function providing apparatus among the function providing apparatuses includes:
- a receiving unit that receives a use request to use the function providing apparatus, the use request including identification information identifying an operation unit to be operated to use the first function providing apparatus, or a user using the first function providing apparatus;
- a denial unit that, if the use request is to use the first function providing apparatus in an unauthorized mode, denies use of the function providing apparatus in the unauthorized mode; and
- a notifying unit that, if the use request is to use the first function providing apparatus in the unauthorized mode, notifies the management apparatus of limitation information that limits use of the function providing apparatuses responsive to the use request including the identification information, and
- wherein the management apparatus includes a storage unit that stores the limitation information, upon receiving the limitation information;
- wherein a second function providing apparatus among the function providing apparatuses includes a controller that, if the management apparatus stores the limitation information, performs control to limit the use of the second function providing apparatus responsive to the use request including the identification information,
- wherein the receiving unit receives as the use request a use request of the function providing apparatus to cause the function providing apparatus to view a memory area provided by the different function providing apparatus, and
- wherein the use of the function providing apparatus in the unauthorized mode is to cause the function providing apparatus to view the memory area if viewing of the memory area by the function providing apparatus is not permitted.

15. The function providing system according to claim 14, wherein the notifying unit in the first function providing apparatus notifies the second function providing apparatus of the limitation information in response to a failure to notify the management apparatus of the limitation information, and
- wherein in response to notification of the limitation information, the controller in the second function providing apparatus controls to limit the use of the second function providing apparatus responsive to the use request including the identification information.

16. A non-transitory computer readable medium storing a program causing a computer to execute a process for providing a function, the process comprising:
- receiving a use request to use a function providing apparatus, the use request including identification information identifying an operation unit to be operated to use the function providing apparatus, or a user using the function providing apparatus;
- denying use of the function providing apparatus in the unauthorized mode if the use request is to use the first function providing apparatus in an unauthorized mode; and
- providing information that limits use of another function providing apparatus responsive to the use request including the identification information if the use request is to use the first function providing apparatus in an unauthorized mode,
- wherein the receiving unit receives as the use request a use request of the function providing apparatus to cause the function providing apparatus to view a memory area provided by the different function providing apparatus, and
- wherein the use of the function providing apparatus in the unauthorized mode is to cause the function providing apparatus to view the memory area if viewing of the memory area by the function providing apparatus is not permitted.

* * * * *